(12) United States Patent
Marsters et al.

(10) Patent No.: US 11,730,095 B2
(45) Date of Patent: **\*Aug. 22, 2023**

(54) METHODS AND SYSTEMS FOR USE IN CONTROLLING IRRIGATION

(71) Applicant: Rain Bird Corporation, Azusa, CA (US)

(72) Inventors: Jonathan I. Marsters, San Diego, CA (US); Douglas H. Callison, Winchester, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,843

(22) Filed: Jan. 10, 2022

(65) Prior Publication Data

US 2022/0124994 A1  Apr. 28, 2022

Related U.S. Application Data

(63) Continuation of application No. 16/542,749, filed on Aug. 16, 2019, now Pat. No. 11,234,379, which is a
(Continued)

(51) Int. Cl.
*A01G 25/16* (2006.01)
*G05D 7/06* (2006.01)
(Continued)

(52) U.S. Cl.
CPC ........... *A01G 25/165* (2013.01); *A01G 25/16* (2013.01); *G05B 15/02* (2013.01);
(Continued)

(58) Field of Classification Search
None
See application file for complete search history.

(56) References Cited

U.S. PATENT DOCUMENTS

| 5,229,937 | A | 7/1993 | Evelyn-Veere |
| 6,600,971 | B1 | 7/2003 | Smith |

(Continued)

OTHER PUBLICATIONS

USPTO; U.S. Appl. No. 14/098,306; Notice of Allowance dated Nov. 12, 2014.
(Continued)

*Primary Examiner* — Sean Shechtman
(74) *Attorney, Agent, or Firm* — Fitch, Even, Tabin & Flannery LLP

(57) ABSTRACT

Some embodiments provide systems and methods of controlling irrigation, comprising: communicating an assumption broadcast from a first irrigation controller to each of a plurality of other irrigation controllers defining assumed states of control elements, wherein the control elements are shared with one or more of the first irrigation controller and the other irrigation controllers; determining whether a reply is received from one or more of the other irrigation controllers in reply to the assumption broadcast; identifying, from the reply, a correction to a state corresponding to a first control element; updating state information corresponding to the first control element in response to the identifying the correction; and communicating a subsequent notification from the first irrigation controller to each of the plurality of other irrigation controllers of the irrigation system, where the subsequent notification comprises the updated state information corresponding to the first control element.

23 Claims, 18 Drawing Sheets

Related U.S. Application Data continuation of application No. 15/243,625, filed on Aug. 22, 2016, now Pat. No. 10,420,295, which is a continuation of application No. 14/621,229, filed on Feb. 12, 2015, now Pat. No. 9,445,556, which is a continuation of application No. 14/098,306, filed on Dec. 5, 2013, now Pat. No. 8,989,908, which is a continuation of application No. 13/224,140, filed on Sep. 1, 2011, now Pat. No. 8,630,743.

(51) Int. Cl.
    *G05B 15/02*     (2006.01)
    *G05B 19/042*    (2006.01)

(52) U.S. Cl.
    CPC ....... *G05B 19/0426* (2013.01); *G05D 7/0617* (2013.01); *G05D 7/0635* (2013.01); *G05B 2219/2625* (2013.01)

(56) References Cited

U.S. PATENT DOCUMENTS

| | | |
|---|---|---|
| 6,708,084 B2 | 3/2004 | Battistutto |
| 6,772,050 B2 | 8/2004 | Williams |
| 6,898,467 B1 | 5/2005 | Smith |
| 7,257,465 B2 | 8/2007 | Perez |
| 7,345,998 B2 | 3/2008 | Cregg |
| 7,403,840 B2 | 7/2008 | Moore |
| 7,444,207 B2 | 10/2008 | Nickerson |
| 7,546,181 B2 | 6/2009 | Vidovich |
| 7,640,079 B2 | 12/2009 | Nickerson |
| 7,844,367 B2 | 11/2010 | Nickerson |
| 7,844,369 B2 | 11/2010 | Nickerson |
| 7,996,192 B2 | 8/2011 | Repelli |
| 8,630,743 B2 | 1/2014 | Marsters |
| 8,989,908 B2 | 3/2015 | Marsters |
| 9,445,556 B2 | 9/2016 | Marsters |
| 10,420,295 B2 | 9/2019 | Marsters |
| 11,234,379 B2 | 2/2022 | Marsters |
| 11,277,714 B2 | 3/2022 | Griggs |
| 11,281,240 B1 | 3/2022 | Eyring |
| 2002/0091452 A1 | 7/2002 | Addink |
| 2003/0179102 A1 | 9/2003 | Barnes |
| 2004/0217189 A1 | 11/2004 | Regli |
| 2005/0267641 A1 | 12/2005 | Nickerson |
| 2006/0122735 A1 | 6/2006 | Goldberg |
| 2006/0157580 A1 | 7/2006 | Regli |
| 2007/0016334 A1 | 1/2007 | Smith |
| 2007/0173981 A1 | 7/2007 | Vidovich |
| 2008/0027587 A1 | 1/2008 | Nickerson |
| 2008/0034081 A1 | 2/2008 | Marshall |
| 2008/0058964 A1 | 3/2008 | Nickerson |
| 2008/0288117 A1 | 11/2008 | Nickerson |
| 2008/0319585 A1 | 12/2008 | Nickerson |
| 2009/0076660 A1 | 3/2009 | Goldberg |
| 2009/0145974 A1 | 6/2009 | Fekete |
| 2009/0150001 A1 | 6/2009 | Fekete |
| 2009/0150002 A1 | 6/2009 | Fekete |
| 2009/0326723 A1 | 12/2009 | Moore |
| 2010/0030389 A1 | 2/2010 | Palmer |
| 2010/0087958 A1 | 4/2010 | Mullet |
| 2010/0100247 A1 | 4/2010 | Nickerson |
| 2010/0145531 A1 | 6/2010 | Nickerson |
| 2010/0147389 A1 | 6/2010 | Blanchard |
| 2010/0312881 A1 | 12/2010 | Davis |
| 2011/0093123 A1 | 4/2011 | Alexanian |
| 2013/0060389 A1 | 3/2013 | Marsters |
| 2014/0094977 A1 | 4/2014 | Marsters |
| 2015/0150201 A1 | 6/2015 | Marsters |
| 2016/0353678 A1 | 12/2016 | Marsters |
| 2019/0364752 A1 | 12/2019 | Marsters |

OTHER PUBLICATIONS

USPTO; U.S. Appl. No. 14/098,306; Office Action dated Aug. 18, 2014.

USPTO; U.S. Appl. No. 14/098,306; Office Action dated Oct. 21, 2014.

USPTO; U.S. Appl. No. 14/621,229; Notice of Allowance dated May 20, 2016.

USPTO; U.S. Appl. No. 14/621,229; Office Action dated Apr. 21, 2015.

USPTO; U.S. Appl. No. 14/621,229; Office Action dated Nov. 23, 2015.

USPTO; U.S. Appl. No. 15/243,625; Notice of Allowance dated May 13, 2019.

USPTO; U.S. Appl. No. 15/243,635; Office Action dated Oct. 26, 2018.

USPTO; U.S. Appl. No. 16/542,749; Notice of Allowance dated Sep. 16, 2021.

USPTO; U.S. Appl. No. 13/224,140; Notice of Allowance dated Sep. 5, 2013.

METHODS AND SYSTEMS FOR USE IN CONTROLLING IRRIGATION

This application is a continuation of U.S. application Ser. No. 16/542,749, filed Aug. 16, 2019, for Marsters et al., entitled METHODS AND SYSTEMS FOR USE IN CONTROLLING IRRIGATION, which is a continuation of U.S. application Ser. No. 15/243,625, filed Aug. 22, 2016, for Marsters et al., entitled METHODS AND SYSTEMS FOR USE IN CONTROLLING IRRIGATION, which is a continuation of U.S. application Ser. No. 14/621,229, filed Feb. 12, 2015, for Marsters et al., entitled METHODS AND SYSTEMS FOR USE IN CONTROLLING IRRIGATION, which is a continuation of U.S. application Ser. No. 14/098,306, filed Dec. 5, 2013, for Marsters et al., entitled METHODS AND SYSTEMS FOR USE IN CONTROLLING IRRIGATION, now U.S. Pat. No. 8,989,908, which is a continuation of U.S. application Ser. No. 13/224,140, filed Sep. 1, 2011, for Marsters et al., entitled METHODS AND SYSTEMS FOR USE IN CONTROLLING IRRIGATION, now U.S. Pat. No. 8,630,743, all of which are incorporated in their entirety herein by reference.

BACKGROUND

1. Field of the Invention

The present invention relates generally to irrigation, and more specifically to controlling irrigation.

2. Discussion of the Related Art

Water continues to be a precious commodity. Further, the conservation of water continues to be a topic of great interest to governments, water authorities, municipalities, farms, corporations, and individual consumers. Additionally, the price of water continues to rise.

Accordingly, the use of water and its application in irrigation is becoming more important. Similarly, the control of the application of water in irrigation is also becoming more important. Many irrigation systems employ multiple controllers to control irrigation over a geographic area. These systems utilize master valves to, at least in part, control the water flow through the irrigation system. Some systems further utilize sensors in identifying parameters that can be used to control irrigation.

SUMMARY OF THE INVENTION

Several embodiments of the invention advantageously address the needs above as well as other needs by providing methods of controlling irrigation. In some embodiments, methods of irrigation comprise: communicating an assumption broadcast from a first irrigation controller to each of a plurality of other irrigation controllers of an irrigation system, where the assumption broadcast defines assumed states of operation of one or more control elements each coupled to a respective one of the first irrigation controller or a respective one of the plurality of other irrigation controllers of the irrigation system, wherein the irrigation system is configured to implement irrigation scheduling instructions, wherein the one or more control elements are shared with one or more of the first irrigation controller and the plurality of other irrigation controllers of the irrigation system that are not coupled to the one or more control elements; determining whether a reply is received from one or more of the plurality of other irrigation controllers in reply to the assumption broadcast; identifying, from the reply, a correction to a state corresponding to a first control element of the one or more control elements, where the first control element is associated with a first of the plurality of other irrigation controllers; updating state information corresponding to the first control element in response to the identifying the correction; and communicating a subsequent notification from the first irrigation controller to each of the plurality of other irrigation controllers of the irrigation system, where the subsequent notification comprises the updated state information corresponding to the first control element.

In some embodiments, an irrigation system comprises: a computer-based central irrigation controller configured to communicationally couple with multiple satellite irrigation controllers; and a sub-system comprising: a server satellite irrigation controller of the multiple satellite irrigation controllers, in communication with the central irrigation controller; one or more client satellite irrigation controllers, of the multiple satellite irrigation controllers, where the one or more client satellite irrigation controllers are in communication with the server satellite irrigation controller and where each of the one or more of client satellite irrigation controllers controls one or more irrigation devices in implementing respective irrigation scheduling instructions received from the computer-based central irrigation controller via the server satellite irrigation controller and stored at each of the one or more client satellite irrigation controllers; and one or more control elements, where each of the one or more control elements are coupled to a respective one of the server satellite irrigation controller or the one or more of the client satellite irrigation controllers, and where the one or more control elements are shared with one or more of the server satellite irrigation controller and the one or more client satellite irrigation controllers of the sub-system that are not coupled with the control element; where the server satellite irrigation controller is configured to: communicate an assumption broadcast to each of the one or more client satellite irrigation controllers, where the assumption broadcast defines assumed states of operation of the one or more control elements; determine whether a reply is received from one of the one or more client satellite irrigation controllers in reply to the assumption broadcast; identify, from the reply, a correction to a state corresponding to a first control element of the one or more control elements, where the first control element is associated with at least the one of the one or more client satellite irrigation controllers; update state information corresponding to the first control element in response to the identifying the correction; and communicate a subsequent notification to each of the one or more client satellite irrigation controllers, where the subsequent notification comprises the updated state information corresponding to the first control element.

In other embodiments, methods of controlling irrigation comprise: receiving, at a first client satellite irrigation controller of a sub-system of a central control irrigation system, an assumption broadcast communicated from a server satellite irrigation controller to each of one or more client satellite irrigation controllers of the sub-system, where the assumption broadcast comprises a plurality of state identifiers identifying assumed states of one or more control elements within the sub-system, wherein the central control irrigation system includes a computer based central controller configured to communicate irrigation scheduling instructions to the server satellite irrigation controller, wherein the one or more control elements are shared with one or more of the server satellite irrigation controller and the one or more client satellite irrigation controllers of the sub-system that are not coupled to the one or more control elements; identifying within the assumption broadcast each state identifier that is associated with one or more shared control elements shared with the first client satellite irrigation controller; determining whether one or more of the state identifiers associated with the shared control elements shared with the first client satellite irrigation controller are inconsistent with an irrigation scheduling instruction being implemented by the first client satellite irrigation controller; and communicating a reply to the assumption broadcast when it is determined that one or more of the state identifiers associated with the shared control elements shared with the first client satellite irrigation controller are inconsistent with the irrigation scheduling instruction.

Further, in some embodiments, a method of controlling irrigation comprises: communicating, from a first additional irrigation controller of a plurality of additional irrigation controllers of an irrigation system and to a first irrigation controller of the irrigation system, a request that a first control element, being shared with and not directly controlled by the first additional irrigation controller, be transitioned to a first state in accordance with an irrigation scheduling instruction stored at the first additional irrigation controller and being implemented by the first additional irrigation controller in response to the first additional irrigation controller determining the first control element is in a second state and inconsistent with the irrigation scheduling instruction, wherein the first control element is shared with the first additional irrigation controller and one or more of the first irrigation controller and the plurality of additional irrigation controllers of the irrigation system and where the plurality of additional irrigation controllers are cooperated, within the irrigation system, with the first irrigation controller; pausing, at the first additional irrigation controller, the irrigation scheduling instruction at a beginning of an irrigation cycle being implemented at the first additional irrigation controller; receiving a notification identifying that the first control element has been changed to the first state; unpausing, at the first additional irrigation controller, the irrigation scheduling instruction at the first additional irrigation controller in response to the notification that the first control element has been changed to the first state; and executing, at the first additional irrigation controller, the irrigation scheduling instruction.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
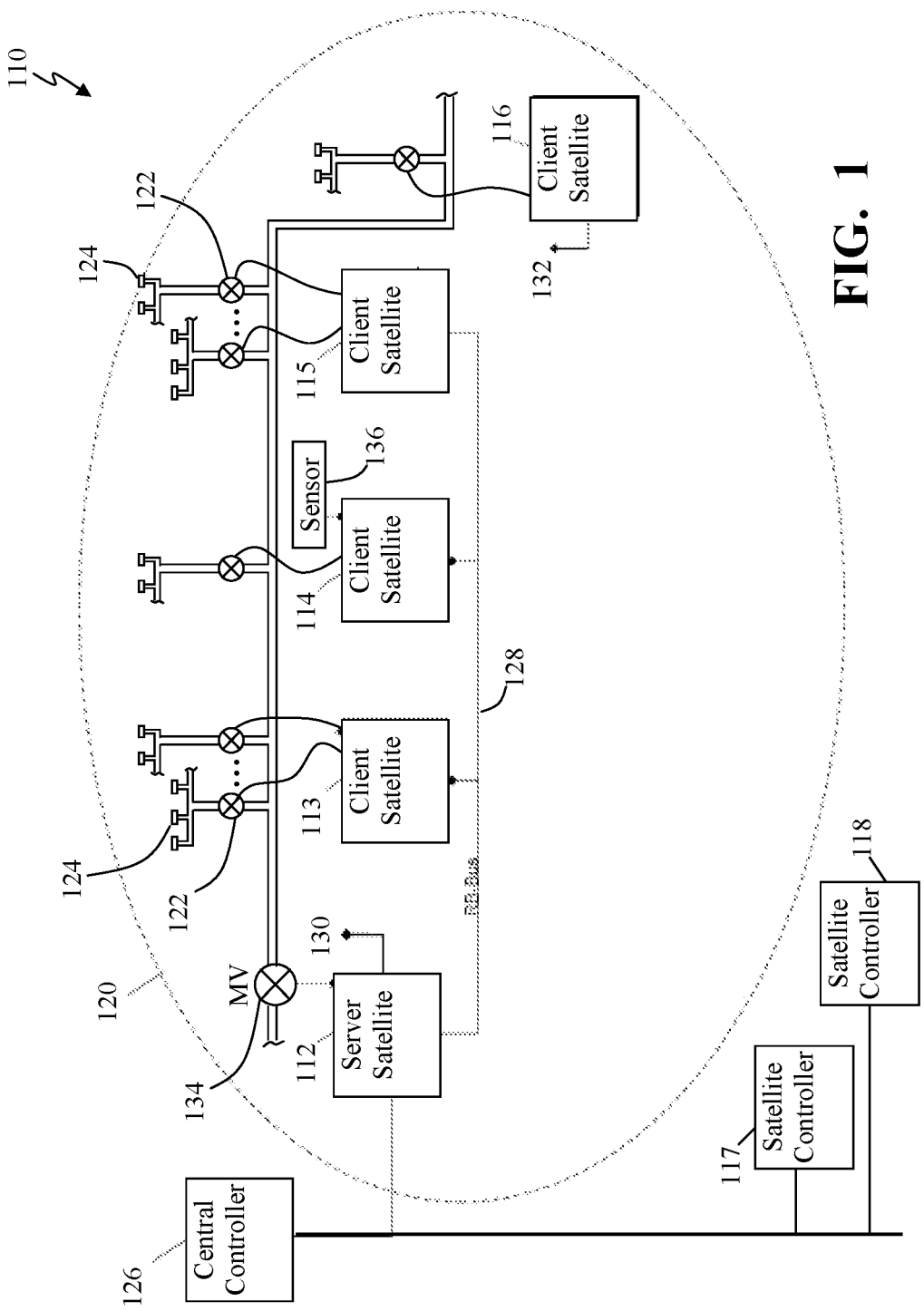
FIG. 1 depicts a simplified block diagram of an irrigation system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a simplified block diagram of an irrigation system 110 according to some embodiments. The irrigation system 110 comprises a plurality of irrigation controllers 112-118 distributed over a geographic area, with at least some of the plurality of irrigation controllers 112-118 being cooperated in an irrigation sub-system 120. Typically, a first irrigation controller 112 of the irrigation sub-system 120 communicates with each of the other irrigation controllers 113-116 of the irrigation sub-system 120, while the other irrigation controllers 113-116 of the irrigation sub-system 120 typically do not communicate between each other. It is noted, however, that in some embodiments one or more of the other irrigation controllers 113-116 (e.g., second irrigation controller 113) can act as a relay or repeater to forward a communication from the first irrigation controller 112 to a subsequent irrigation controller (e.g. fifth irrigation controller 116). Each of the irrigation controllers 112-118, in some implementations, are configured to couple with and control one or more irrigation valves or solenoids 122 to control the supply of water to one or more water distribution devices 124, such as but not limited to sprinklers, drip lines, and other such water distribution devices.

In some embodiments, the irrigation system 110 is configured as a central control irrigation system that includes a central controller 126 that cooperates with and communicates with the plurality of irrigation controllers 112-118, which are satellite irrigation controllers in these central control irrigation implementations. For simplicity, the below description generally refers to the irrigation controllers 112-118 as satellite irrigation controllers. Additionally for simplicity and clarity, the first irrigation controller 112 is further referred to below as a server satellite irrigation controller (SS) 112, and the other irrigation controllers 113-116 of the irrigation sub-system 120 are referred to below as client satellite irrigation controllers (CS) 113-116. These identifiers, however, should not be interpreted in a narrowing sense and should not narrow the scope of the invention.

The SS 112 is in communication with each of the CSs 113-116 over a wired and/or wireless communication network. In the representation of FIG. 1, the SS 112 is in communication with first through third CSs 113-115 over a wired communication network and/or bus 128, and in wireless communication with the fourth CS 116 established through one or more wireless transceivers 130 at the SS 112 and one or more wireless transceivers 132 at the CSs (e.g., fourth CS 116).

The central controller 126 provides at least some control over the irrigation implemented by at least the irrigation sub-system 120. In some implementations, the central controller 126 is implemented through a computer based central controller operated on one or more computers that can be located remote from the SS 112, CSs 113-116, one or more other irrigation controllers 117-118, and other irrigation sub-systems. Further, the central controller 126 can be implemented in part to coordinate the irrigation by the SS 112, CSs 113-116 and other irrigation controllers 117-119. In some embodiments, the central controller 126 is configured to at least in part communicate irrigation scheduling instructions and relevant irrigation system configurations to the SS 112, CSs 113-116 and/or the additional irrigation controllers 117-118. Further, the SS 112 can distribute commands and/or information over the irrigation sub-system 120 to the appropriate CSs 113-116. The SS 112 and CSs 113-116 are further configured to receive, store and implement corresponding irrigation scheduling and include the intelligence to implement the scheduling. Typically, the central controller 126 distributes irrigation scheduling to each SS 112, CS 113-116 and, when relevant, to the additional irrigation controllers 117-118 of the irrigation controller such that each SS 112, CS 113-116 and additional irrigation controller 117-118 locally implements their respective irrigation scheduling, which can include making determinations and/or adjustments, such as based on sensor data, without explicit instructions from the central controller 126.

The irrigation sub-system 120 is further configured to provide cooperative sharing of one or more control elements 134, which in some instances can be master valves, override switches, other switches, pumps, sensors, station valves, flow sensors, or other such control elements. For simplicity, the below description refers to master valves 134 and/or sensors 136, however, other control elements can similarly be used and shared within an irrigation sub-system 120. The one or more shared master valves 134 are shared between two or more of the SS 112 and CSs 113-116, and communication between the SS 112 and the CSs 113-116 provides for the control of the shared master valve 134 so that it is open or opened when each of the two or more of the SS 112 or CSs 113-116 that share the master valve 134 are to implement irrigation. For example, in the embodiment depicted in FIG. 1 the master valve 134 is directly controlled by and/or physically connected to the SS 112. The SS 112 issues commands to the master valve 134 when the master valve is to be opened and/or closed. Further, in some instances, the CSs 113-116 that do not directly control the shared master valve 134 notify the SS 112 when the state of the master valve is inconsistent with a state anticipated or needed by the CSs 113-116. Accordingly, the CSs 113-116 that share the master valve 134 can indirectly control the shared master valve 134 that is not directly connected to the CS.

The irrigation sub-system 120 may include multiple master valves with one or more of those master valves being shared between two or more of the SS 112 and the CSs 113-116. In some implementations, a master valve is a protection valve that is positioned physically and hydraulically upstream of station or irrigation valves 122 on more than one of the SS and CSs, where a master valve can shut off the water to a number of stations. A master valve 134 is electrically controlled by one of the SS or a CS that is directly coupled with the master valve to open the master valve when the controlling SS or CS or one of the SS or CSs that share the master valve needs the master valve open in order to perform irrigation.

As introduced above, the irrigation system 110 may include additional irrigation controllers 117-118 that are not part of the irrigation sub-system 120. Further, the irrigation system 110 can include multiple irrigation sub-systems, and those multiple irrigation sub-systems can each cooperate with the central controller 126 when the irrigation system 110 is configured as a central control irrigation system.

In some embodiments, the irrigation sub-system 120 may further include one or more sensors 136. Additionally, in some instances the one or more sensors can also be shared between one or more of the SS 112 and the CSs 113-116. Accordingly, the number of sensors can be reduced while relevant sensor data can be provided to each of the corresponding SS 112 and CSs 113-116 that are sharing a sensor 136. For example, in the representation presented in FIG. 1 the sensor 136 is directly coupled with and communicates with a second CS 114 supplying sensor information to the second CS 114. Based on the information provided by the sensor 136 the second CS 114 can then forward this sensor information to the SS 112 that can distribute this information to be used by one or more of the SS 112 and/or the other CSs 113, 115-116 that share the sensor 136. Additionally, in some instances the information can be forwarded to the central controller 126. The sensor 136 can be substantially any relevant sensor that provides information relevant to the irrigation system 110, irrigation sub-system 120 and/or the implementation of irrigation scheduling. For example, the sensor 136 can be configured to sense rain, wind, soil moisture, rain freeze, temperature, water flow (e.g., pulse train), humidity and/or other such parameters. Typically, a sensor provides electrical input to the SS or CS that is directly in communication with the sensor, which can take one or more action as a result of the sensor data. In some instances, a SS or CS may pause or shut down some or all irrigation in response to sensor data.

The shared sensor data can be obtained by a CS directly cooperated with the sensor 136, in this example, second CS 114. The second CS 114 can then forward relevant sensor information to the SS 112 to be used by the SS when the SS shares the sensor 136, and/or the SS 112 can subsequently distribute the sensor data over the irrigation sub-system 120 to one or more other CSs 113, 115-116 sharing the sensor 136. Accordingly, sensor data corresponding to the irrigation sub-system 120 can be obtained through a single sensor 136 and distributed to one or more of the SS 112 and/or other CSs 113, 115-116 not directly coupled with the sensor 136 to be used in implementing, adjusting and/or halting irrigation scheduling. In some embodiments, however, the CS directly in communication with the sensor 136 (in the example of FIG. 1, the second CS 114) does not immediately send a notice or the sensor data to the SS 112 upon receiving the sensor data (e.g., an indication from the sensor that a threshold has been crossed). Instead, in some embodiments, the second CS 114 waits for a polling from the SS and/or an assumption broadcast, as more fully described below. As such, some embodiments allow for control elements (e.g., master valve and sensor) to be shared between multiple irrigation controllers of an irrigation system as if the control elements were connected directly to the multiple irrigation controllers.

Figure 2:
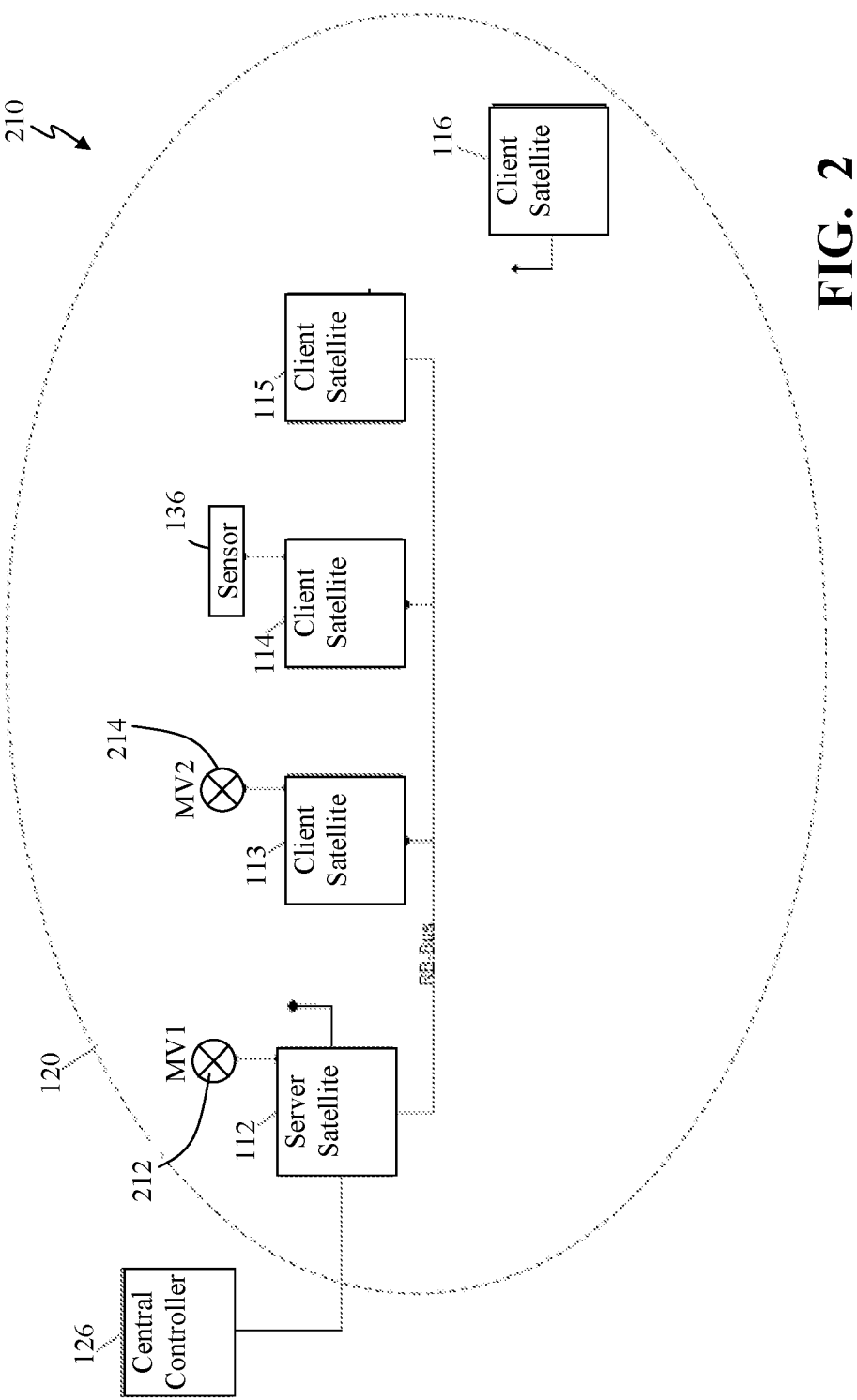
FIG. 2 depicts a simplified block diagram of an irrigation system according to some embodiments.

FIG. 2 depicts a simplified block diagram of an irrigation system 210 according to some embodiments. The irrigation system 210 includes a SS 112 and a plurality of CSs 113-116 within the irrigation sub-system 120. A central controller 126 is included in some implementations and communicates with the SS 112 and/or the CSs 113-116. In these embodiments, the irrigation sub-system 120 includes two master valves 212, 214. The first master valve 212 is directly controlled by the SS 112 (master valve owner) and shared by the third and fourth CSs 115-116 (master valve borrowers). As such, the first master valve 212 has to be in an active or open state to allow water to flow to the irrigation valves 122 directly controlled by each of the SS 112, the third and the fourth CSs 115-116 at the time the SS, third and/or fourth CSs are to implement irrigation according to irrigation scheduling.

Similarly, the second master valve 214 is directly controlled by and/or physically connected with the first CS 113 (master valve owner) and shared by the second CS 114 (master valve borrower). Accordingly, when the first and/or second CSs 113-114 is scheduled to implement irrigation the second master valve 214 has to be active or open to allow water to flow to the irrigation valves or solenoids 122 controlled by the first and second CSs 113-114. In some instances, the second CS 114 further confirms that the second master valve 214 is in an open state at the time irrigation is to be activated, while the third and fourth CSs 115-116 can confirm that the first master valve 212 is in an open state at the time irrigation is to be activated.

A sensor 136 is in direct communication with the second CS 114. This sensor 136 can be shared by one or more of the SS 112 and/or CSs 113-116. In some instances, the second CS 114 notifies the SS 112 of the state of the sensor and/or provides sensor information to the SS. The SS 112 can then notify one or more of the first, third and/or fourth CSs, which can then use the sensor information in determining whether irrigation is to be implemented as scheduled, whether adjustments are to be implemented and/or whether irrigation is to be interrupted or prevented.

Figure 3:
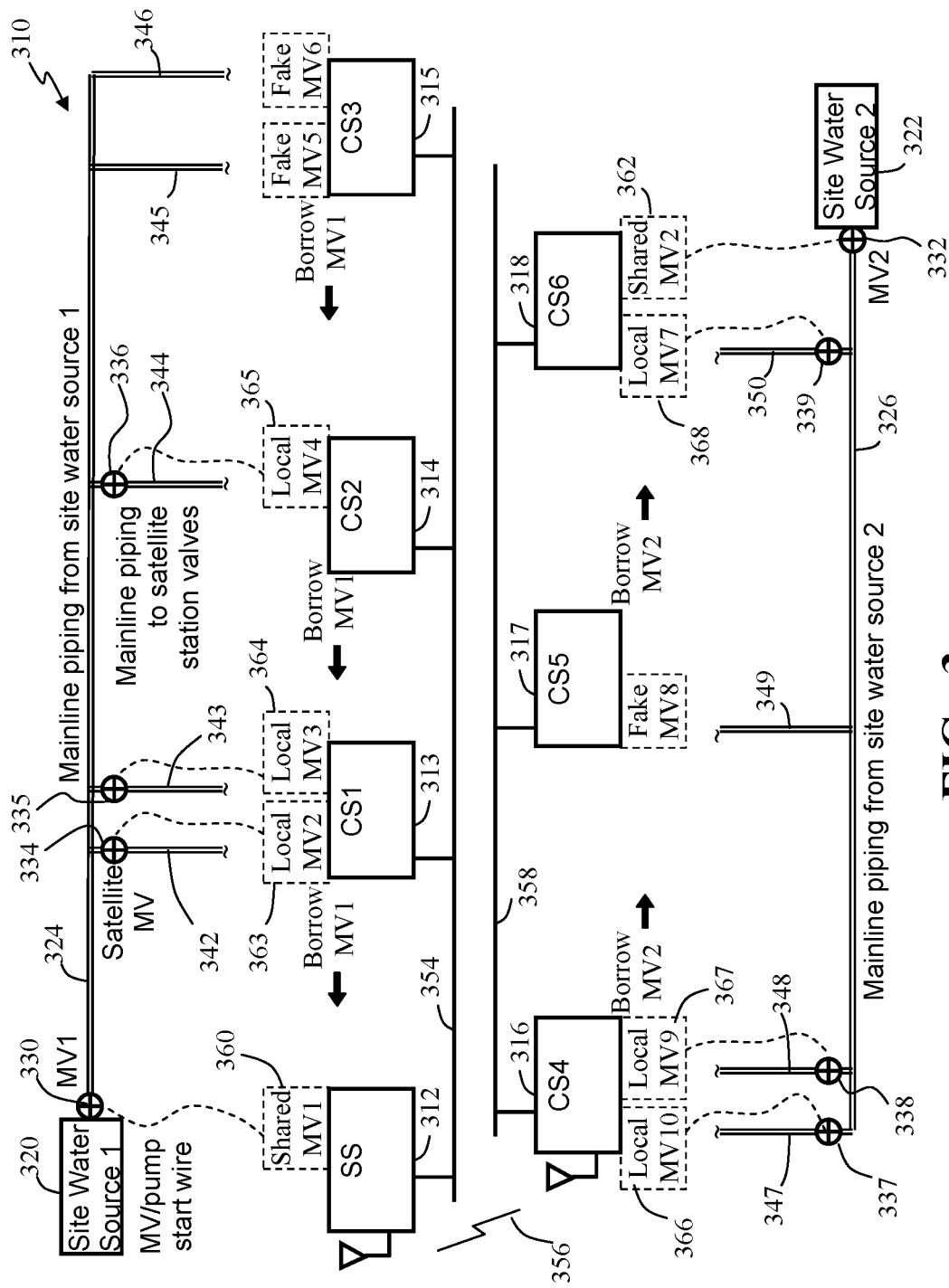
FIG. 3 depicts a simplified block diagram of an irrigation sub-system according to some embodiments.

FIG. 3 depicts a simplified block diagram of an irrigation sub-system 310 according to some embodiments. Typically, the irrigation sub-system 310 is operated as part of an irrigation system, such as the irrigation system 110 of FIG. 1. The irrigation sub-system 310 includes a SS 312 and six CSs 313-318, a first water source 320, a second water source 322, a first main water line 324, a second main water line 326, a first master valve 330, a second master valve 332, a plurality of sub or satellite master valves 334-339, and a plurality of branch water lines 342-350.

The SS 312 is in communication with the CSs 313-318. In some embodiments, the SS 312 is in communication with the first through third CSs 313-315 over a single wired communication link, bus 354 or other relevant communication link. The SS 312 is in further communication with the fourth CS 316 through a wireless communication link 356. Further, the SS 312 can be in communication with the fifth and sixth CSs 317-318 through the same or similar wireless communication links, or through the fourth CS 316 relaying the communications over a communication bus 358.

The first water source 320 is cooperated with the first main water line 324 that in turn supplies water to a first set of branch water lines 342-346. The first master valve 330 is directly controlled by the SS 312, as represented by the dashed master valve driver 360. Additionally, the first master valve 330 is shared by the first through third CSs 313-315 and controls the water flow to the branch water lines 342-346 associated with the first through third CSs 313-315.

Similarly, the second water source 322 is cooperated with the second main water line 326 that in turn supplies water to a second set of branch water lines 347-350. The second master valve 332 is directly controlled by the sixth CS 318, as represented by the dashed master valve driver 362. Further, the second master valve 332 is shared by the fourth through sixth CSs 316-318 and controls the water flow to the branch water lines 347-350 associated with the fourth through sixth CSs 316-318.

In some instances, satellite master valves 334-339 are cooperated with branch water lines 342-344, 347, 348 and 339 to allow corresponding CSs 313, 314, 316, 318 to control water flow to one or more irrigation valves, solenoids or other such devices (not depicted in FIG. 3). In the embodiment represented in FIG. 3, the first CS 313 shares the first master valve 330 while directly controlling the first and second satellite master valves 334, 335 and controlled by master valve drivers 363-364. The second CS 314 similarly shares the first master valve 330 while directly controlling a third satellite master valve 336 through a master valve driver 365 such that the satellite master valve 336 when opened allows water to flow into the branch water line 344 associated with the second CS 314 and to irrigation water valves and/or watering devices controlled by the second CS 314. The third CS 315 does not directly control the first master valve 330 or any of the satellite master valves, and instead, shares the master valve 330 directly controlled by the SS 312 such that water is supplied to branch water lines 345-346 associated with the third CS 315 when the master valve 330 is open supplying water to the first main water line 324.

The fourth CS 316 directly controls fourth and fifth satellite master valves 337-338 through master valve drivers 366-337, while borrowing the second master valve 332. The sixth CS 318 directly controls a sixth satellite master valve 339 through the master driver 368 in addition to the direct control over the second master valve 332 shared by the third and fourth CSs 316-317.

In some embodiments, the SS 312 polls the irrigation sub-system 310 for borrower requests from one or more of the first through third CSs 313-315 borrowing a master valve (e.g., first master valve 330) to turn on and/or open a master valve. When a borrowing CS request is posted, the SS 312 either activates the first master valve 330 when the SS directly controls the shared master valve or issues a command over the irrigation sub-system 310 to a CS in direct control of the shared master valve. In some instances, the command is a broadcast communication, and the corresponding CS directly controlling the relevant shared master valve identifies the command is directed to that CS and implements the command. The SS 312 can similarly issue a close command when the CSs sharing the master valve no longer need the master valve open. In some instances, the master valve is maintained in an open state as long as requests from a borrower CS are received, and when relevant the SS issues a command to the CS directly controlling the master valve to close the master valve when no further borrower requests are received.

As described above, in some embodiments, the communication over an irrigation sub-system, such as irrigation sub-system 310 of FIG. 3, is achieved through the SS 312. In these embodiments, the SS 312 provides instructions to one or more CSs 313-318 that control a master valve shared by one or more of the SS 112 and the CSs 313-318. Similarly, sensor information can be distributed by the SS 312 to one or more of the CSs 313-318 that share a sensor not in direct communication with the SS 312 and/or CSs 313-318.

Figure 4:
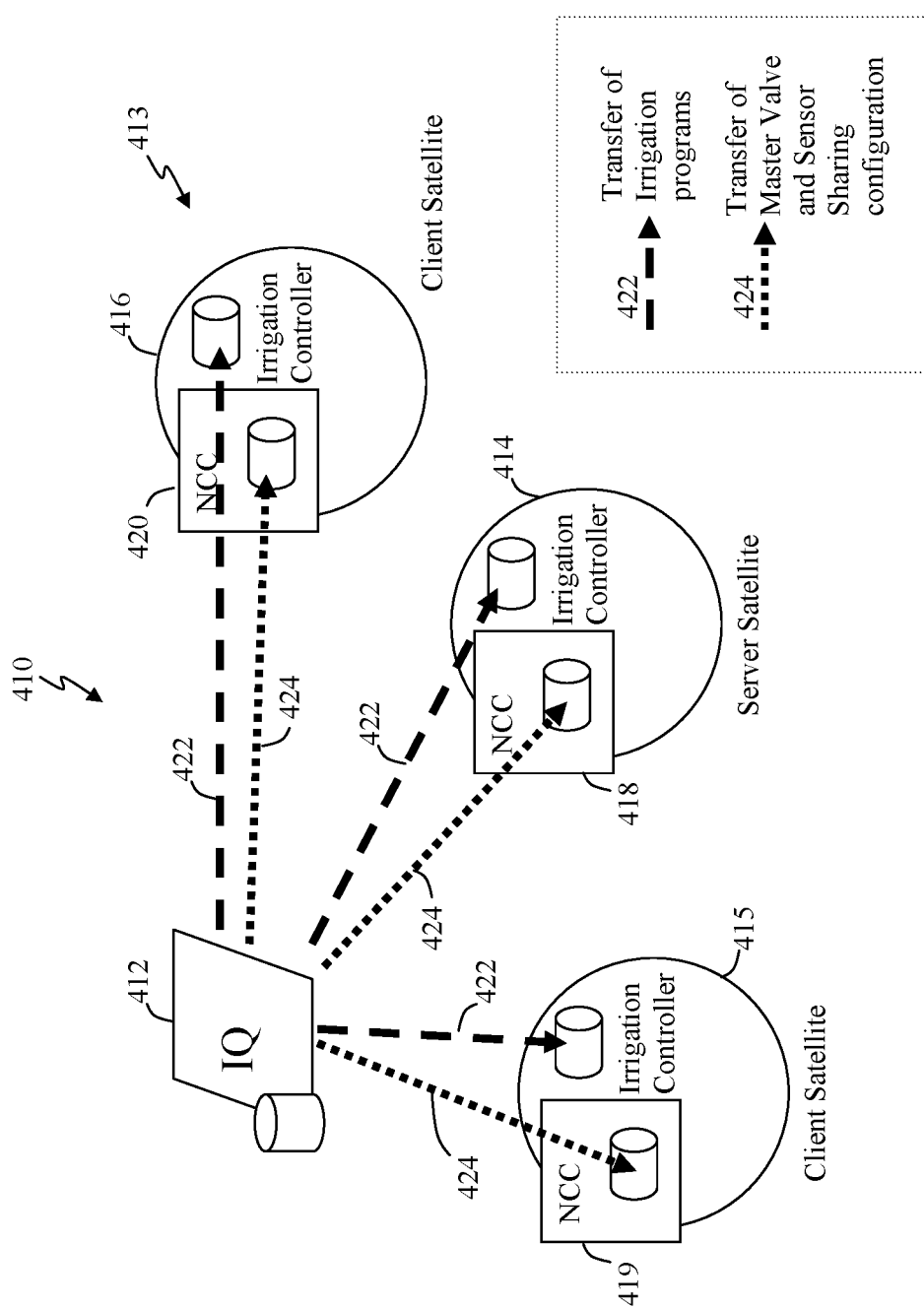
FIG. 4 depicts a simplified block diagram of an irrigation system according to some embodiments.

FIG. 4 depicts a simplified block diagram of an irrigation system 410 showing a logical distribution according to some embodiments. The irrigation system 410 includes a central controller 412, and an irrigation sub-system 413 comprising a SS 414 and two or more CSs 415-416. Each of the SS 414 and the CSs 415-416 include a communication interface 418-420 (e.g., a network communication cartridge (NCC)) that are configured to allow the SS 414 and CSs 415-416 communicate, and typically to communicate with the central controller 412.

In some embodiments, the central controller 412 is configured to communicate corresponding irrigation programs or schedules 422 to the SS 414 and/or CSs 415-416 to be stored and implemented by the SS and/or CSs. Typically, the irrigation schedules 422 are communicated from the central controller 412 to the SS 414 via messages. The SS in turn forwards the network messages the appropriate CSs 415-416. The central controller 412 can further be configured to communicate irrigation system configurations and/or irrigation sub-system configurations. For example, the central controller 412 can distribute to one or more of the SS 414 and CSs 415-416 a master valve and/or sensor sharing configuration that can be stored locally on the SS 414 and CSs 415-416, and that identifies which devices of the irrigation sub-system 313 share which master valve(s) and/or sensor(s). Again, the SS 414 typically receives the master valve and/or sensor sharing configurations via messages and distributes the configuration messages to the relevant CSs 415-416. In some implementations, a user can define the master valve and/or sensor sharing and the central controller 412 can utilize the user defined information creating the master valve and/or sensor sharing configurations, which may include and/or be used to generate a mapping table or tables that can be distributed to the relevant SS 414 and/or CSs 415-416. As such, the SS 414 and CSs 415-416 can identify the relevant master valve status information and/or relevant sensor information corresponding to the master valve(s) and/or sensor(s) being shared, as well as request changes in states to a shared master valve.

Figure 5:
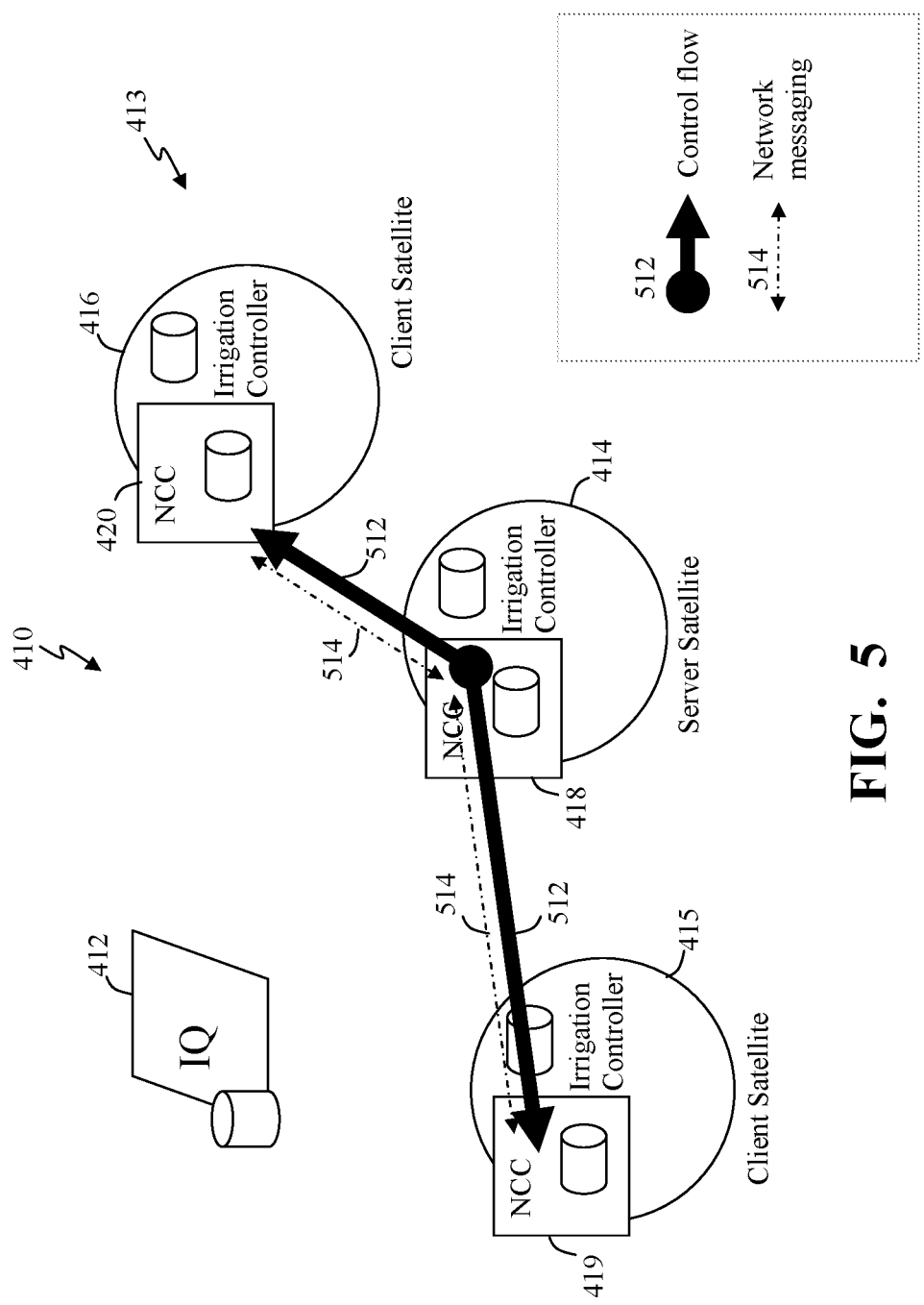
FIG. 5 depicts the simplified block diagram of the irrigation system of FIG. 4, and further illustrates control flow and network messaging between a server satellite irrigation controller (SS) and each of one or more client satellite irrigation controllers (CS).

FIG. 5 depicts the simplified block diagram of the irrigation system 410 of FIG. 4, and further illustrates control flow 512 and network messaging 514 between the SS 414 and each of the CSs 415-416. Again, as described above, the CSs 415-416 do not directly communicate. Instead, master valve status and/or sensor information associated with a CS (e.g., CS 415) is forwarded by the CS 415 to the SS 414 where the SS then distributes this information to those other one or more CSs (e.g., CS 416) in the irrigation sub-system 413 that share the master valve. Again, however, a CS can act as a repeater to a subsequent CS within an irrigation sub-system. Similarly, the central controller 412 typically does not distribute the master valve status and/or sensor information.

Figure 6:
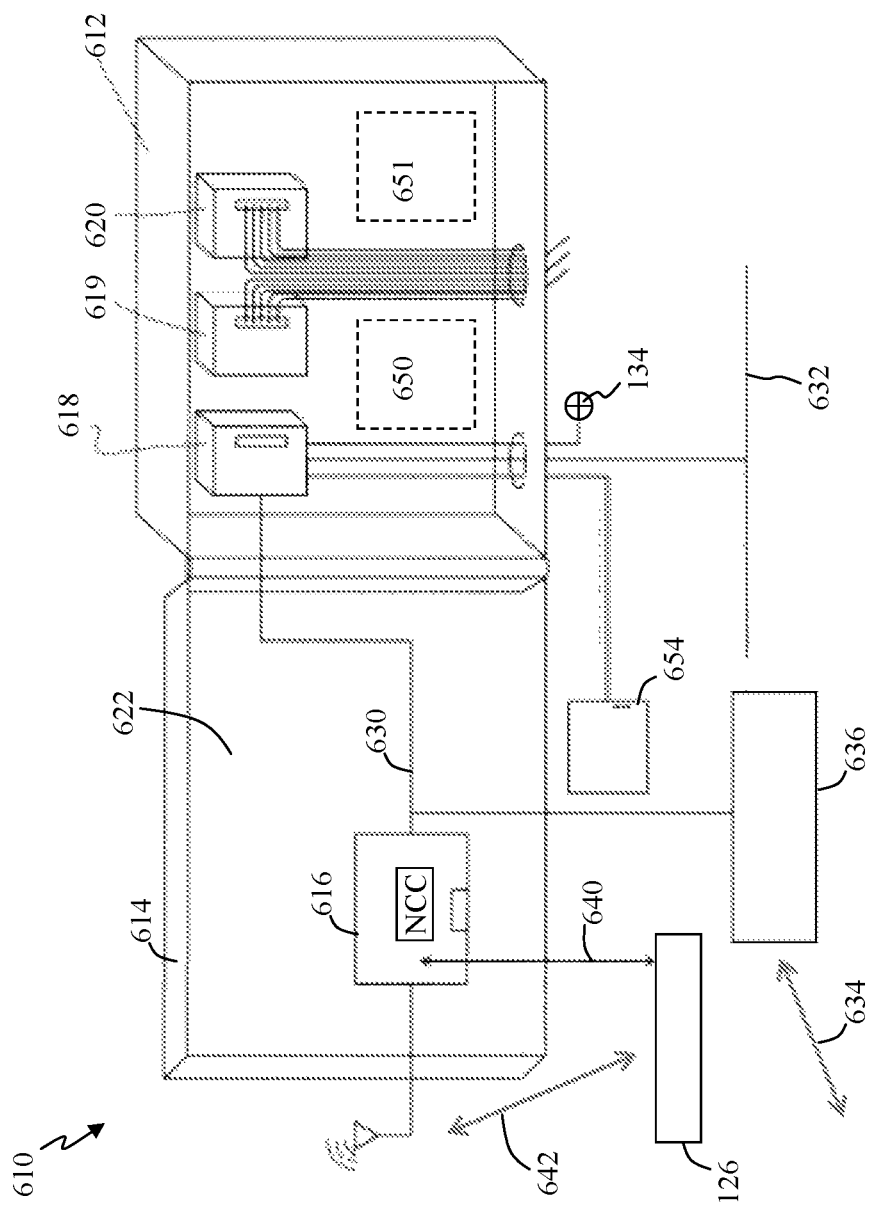
FIG. 6 depicts a simplified block diagram of an irrigation controller, according to some embodiments, and can be used to implement the SS in some implementations.

FIG. 6 depicts a simplified block diagram of an irrigation controller 610, according to some embodiments, and can be used to implement the SS in some implementations, such as the SS 112 of FIG. 1. The irrigation controller 610 includes a casing, housing, box or the like 612 that houses a control panel 614, a communication interface or network communication cartridge 616 and one or more control modules 618-620. The housing 612 can be substantially any relevant housing, and typically protects the interior components from weather conditions. The control panel 614 includes one or more processors and/or memory configured to control and implement irrigation as defined by the irrigation schedule and/or based on inputs supplied by a user directly into a user interface (not shown) of the control panel. In some embodiments, memory of the control panel 614 stores executable program code or instructions that when executed by a processor of the control panel causes the control panel 614 to perform one or more functions such as described herein.

Further, the control panel 614 may include a display and/or other indicators that provide information to the user, such as irrigation scheduling, master valve states, sensor information, irrigation status information, and/or other such information. In some instances, the control panel 614 pivots or rotates out of the housing 612 to allow access to a backside 622 of the control panel 614 as well as an area within the housing 612 behind the control panel where the one or more control modules 618-620 are mounted. FIG. 6 shows the control panel 614 pivoted out in an open position exposing the backside 622 of the control panel and the control modules 618-620.

The communication interface 616 couples with the control panel 614 and, in some instances, mounts to and/or within the backside 622 of the control panel 614 (e.g., within a receiving port of the control panel). The communication interface 616 establishes and provides one or more communication links with the communication interfaces of the CSs 113-116. The communication links can be over a wired communication path 630, which in some instances, is through one of the control modules 618-620 and to a wired communication link 632, such as a bus (e.g., RS-485 bus). Additionally or alternatively, the communication between the communication interface 616 and one or more CSs can be over a wireless communication link 634, for example by coupling the communication interface 616 with a wireless radio transmitter or transceiver 636 that can implement substantially any relevant wireless communication protocol (e.g., radio frequency, Wi-Fi, cellular, and other such protocols or combinations of such protocols). In some embodiments, the communication interface 616 does not communicate through the control panel 614, but communicates through the connection module 618 or through a wireless link 634 via the wireless transceiver 636.

In some instances, the communication interface 616 can further establish a communication link between the irrigation controller 610 and the central controller 126 when present. The communication link can be established via a wired link 640 (e.g., employing an RS-232 communication link, Ethernet, fiber optic, or other such links or combinations of such links) and/or via wireless link 642 (e.g., Wi-Fi, cellular, radio frequency, optical, or other such wireless communication protocols or combinations of such protocols). In some embodiments, memory of the communication interface 616, and/or in cooperation with memory of the control panel 614 and/or a control module 618-620, stores executable program code or instructions that when executed by a processor of the communication interface 616 causes the communication interface 616 to perform one or more functions such as described herein.

The control modules 618-620 are typically removably mounted into module slots that provide communication links between the irrigation modules and the control panel 614 and/or the communication interface 616. In the example of FIG. 6, three irrigation modules 618-620 are included in three respective mounting slots with two additional mounting slots 650-651 available to receive additional irrigation modules. The irrigation modules can provide various functionalities to the irrigation controller 610.

In some embodiments, a base module or connection module 618 can be included that allows communication interface 616 to establish communication links over the bus 632 with the one or more CSs 113-116 of an irrigation sub-system 120. The connection module 618, in some embodiments, optionally replaces standard base module and/or further includes one or more master valve drivers (not shown) that can drive one or more master valves 134 and/or satellite master valves 334 based on instructions from the communication interface 616 and/or control panel 614. In some implementations, the connection module 618 may further be configured to communication with one or more sensors 654, such as a flow sensor, weather sensor and/or other relevant sensor(s). For example, in some embodiments, the connection module 618 can be implemented through a Flow Smart Connection Module (FSCM) provided by the Rain Bird Corporation. Information obtained from the sensor 654 can be forwarded to the control panel 614 for use by the control panel in controlling the implementation of an irrigation schedule, and/or forwarded to the communication interface 616, which may forward some or all of the information to one or more CSs 113-116 and/or the central controller 126.

Other control modules 619-620 can be incorporated into the irrigation controller 610. For example, control modules 619-620 can be irrigation station modules that include irrigation valve drivers that can each send control signals one or more irrigation valves as instructed by the control panel 614 in accordance with the irrigation schedule and any adjustments that might be implemented based on various factors, such as but not limited to sensor data received from one or more sensors 654 directly controlled by and/or coupled to the irrigation controller 610, other sensors data provided by one or more other CSs 113-116 of the irrigation sub-system from one or more shared sensors, the central controller 126 or other source, modifications specified by a user (e.g., through the user interface of the irrigation controller 610), or other information that is obtained by the irrigation controller 610 and/or the communication interface 616. The number of irrigation valves that can be controlled by the irrigation controller 610 varies depending on the number and type of the connection module 618 and other control modules 619-620. In some instances, the SS 610 can control up to 48 stations and/or irrigation valves, while additional stations or irrigation valves may be controlled with the inclusion of extension modules inserted within the SS 610. Additionally or alternatively, one or more of the control modules 619-620 may be a two-wire path module, or a two-wire path module may be inserted into one of the additional mounting slots 650-651. A two-wire path module can allow the SS 610 to control 200 or more additional stations.

The SS 610 is configured to be a part of an irrigation sub-system 120 in communication with CSs 113-116, which in some embodiments is implemented within a central control irrigation system 110. With the inclusion of the station modules 619-620 the SS 610 can additionally function as a satellite irrigation controller controlling irrigation valves 122, while utilizing the communication interface 616 to further function as a router and/or provide at least some control information of shared control elements to other CSs 113-116 of the irrigation sub-system 120. The communication interface 616 can allow the SS 610 to communicate with the central controller 126 (e.g., a computer, laptop, remote server, or the like) or other directly connected computer (e.g., through a modem).

The connection module 618 includes hardwire connections to establish the wired communication link 632 (e.g., over the bus) that can be connected to the CSs 113-116. In some implementations, the connection module 618 is configured to provide the hardwire connection (e.g., via a RS-485) to the CSs 113-116 without taking up an available station module slot within the SS 610 normally reserved for a station module and/or expansion module. Again, the CSs 113-116 can be coupled to the SS 610 via the bus 632, for example, using RS-485, RS-232/Ethernet or other such communication protocol. As described above, the communication interface 716 can additionally or alternatively couple with one or more CSs 116 via the wireless connection 634. The SS 610 can further control one or more irrigation valves 122 and/or satellite master valves 334, such as through station modules 619-620 that provide station output connectors to couple with and send signals to control irrigation valves 122.

In some embodiments, a standard irrigation controller can be implemented as a SS 610 by incorporating the communication interface 616 in cooperation with the connection module 618. The resulting SS 610 allows for the establishment and implementation of an irrigation sub-system 120 with the SS 610 and one or more CSs 113-116, with the SS 610 in some implementations providing a single communication point of the irrigation sub-system 120 for the central controller 126. Further, the SS 610 can be configured, in some embodiments, as a communication relay and/or router. Information, commands and/or scheduling can be communicated from the central controller 126 and/or other CSs 113-116 to the SS 610, which in turn can forward at least relevant information or commands over the irrigation sub-system 120. For example, irrigation watering schedules for the controllers of an irrigation system 110 are generated and managed from the central controller 126, and these irrigation schedules and control are delivered to the irrigation controllers 112-118. In some instances, the SS 610 receives and delivers the irrigation schedules to those CSs 113-116 of the irrigation sub-system 120. Typically, however, the SS 610 does not generate irrigation schedules or otherwise dictate watering schedules to the CSs 113-116. Further, the SS 610 is configured to coordinate shared resources over the irrigation sub-system 120, such as one or more shared master valves 134 and/or one or more shared sensors 136.

Figure 7:
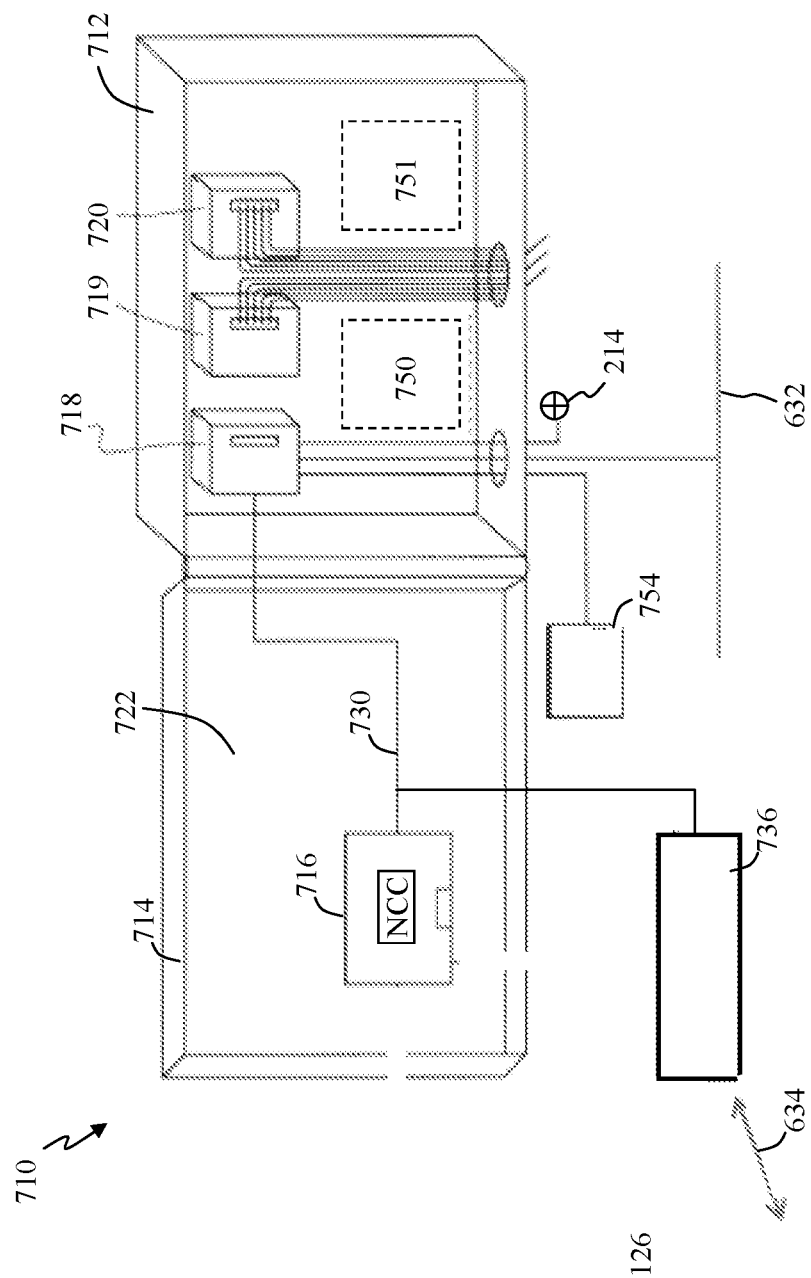
FIG. 7 depicts a simplified block diagram of an irrigation controller, according to some embodiments, which can be used to implement a CS.

FIG. 7 depicts a simplified block diagram of an irrigation controller 710, according to some embodiments, which can be used to implement a CS, such as the first CS 113 of FIG. 2. The CS 710 includes a casing, housing, box or the like 712 that houses a control panel 714, a communication interface or network communication cartridge 716 and one or more control modules 718-720. The housing 712 can be substantially any relevant housing, and typically protects the interior components from weather conditions. The control panel 714 includes one or more processors and/or memory configured to control and implement irrigation as defined by the irrigation schedule and/or based on inputs supplied by a user directly into a user interface (not shown) of the control panel. In some embodiments, memory of the control panel 714 stores executable program code or instructions that when executed by a processor of the control panel causes the control panel 714 to perform one or more functions such as described herein.

Further, the control panel may include a display and/or other indicators that provide information to the user, such as irrigation scheduling, master valve states, sensor information, irrigation status information, and/or other such information. In some instances, the control panel 714 pivots or rotates out of the housing 712 to allow access to a backside 722 of the control panel 714 as well as an area within the housing 712 behind the control panel where the one or more control modules 718-720 are mounted. FIG. 7 shows the control panel 714 pivoted out in an open position exposing the backside 722 of the control panel and the control modules 718-720.

The communication interface 716 couples with the control panel 714 and, in some instances, mounts to and/or within the backside 722 of the control panel 714 (e.g., within a receiving port of the control panel). The communication interface 716 establishes and provides one or more communication links between the control panel 714 and an SS 112, and in some instances when acting as a repeater with one or more other CSs 113-116. The communication links can be over a wired communication path 730, which in some instances is through one of the connection modules 718 and to a wired communication link 632, such as a bus (e.g., RS-485 bus). Additionally or alternatively, the communication between the communication interface 716 and the SS 112 (or one or more CSs when operating as a relay) can be over a wireless communication link 634, for example by coupling the communication interface 716 with a wireless radio transmitter or transceiver 736 that can implement substantially any relevant wireless communication protocol (e.g., radio frequency, Wi-Fi, cellular, and other such protocols or combinations of such protocols). For example, in some instances, an irrigation controller can be upgraded to a CS by incorporating the communication interface 716 in cooperation with the connection module 718. In some embodiments, memory of the communication interface 716, and/or in cooperation with memory of the control panel 714 and/or a control module 718-720, stores executable program code or instructions that when executed by a processor of the communication interface 716 causes the communication interface 716 to perform one or more functions such as described herein.

The control modules 718-720 are typically removably mounted into module slots that provide communication links between the irrigation modules and the control panel 714 and/or the communication interface 716. In the example of FIG. 7, three control modules 718-720 are included in three respective mounting slots with two additional mounting slots 750-751 available to receive additional irrigation modules. The irrigation modules can provide various functionalities to the irrigation controller 710.

In some embodiments, a base module or connection module 718 can be included that allows the communication interface 716 to establish a communication link over the bus 632 with the SS 112 of an irrigation sub system. The connection module 718, in some embodiments, optionally further includes one or more master valve drivers (not shown) that can drive one or more master valves 214 and/or satellite master valves 334 based on instructions from the communication interface 716 and/or control panel 714. In some implementations, the connection module 718 may further be configured to communication with one or more sensors 754, such as a flow sensor, weather sensor and/or other relevant sensor(s). Information obtained from a sensor 754 can be forwarded to the control panel 714 for use by the control panel in controlling the implementation of an irrigation schedule, and/or forwarded to the communication interface 716, which may forward some or all of the information to the SS 112.

Other control modules 719-720 can be incorporated into the CS 710. For example, control modules 719-720 can be irrigation station modules that include irrigation valve drivers that can each send control signals to one or more irrigation valves as instructed by the control panel 714 in accordance with the irrigation schedule and any adjustments that might be implemented based on various factors, such as but not limited to sensor data received from one or more sensors 754 directly controlled by and/or coupled to the CS 710, other sensors data provided by the SS 112 (which may have originated from one or more other CSs 113-116 of the sub system), the central controller 126 or other source, modifications specified by a user (e.g., through the user interface of the CS 710), or other information that is obtained by the CS 710 and/or the communication interface 716. Similar to the SS 610 described above, the number of irrigation valves that can be controlled by the CS 710 varies depending on the number and type of the connection module 718 and other control modules 719-720. In some instances, the CS 710 can control up to 48 stations and/or irrigation valves, while additional stations or irrigation valves may be controlled with the inclusion of extension modules inserted within the CS 710. Additionally or alternatively, one or more of the control modules 719-720 may be a two-wire path module, or a two-wire path module may be inserted into one of the additional mounting slots 750-751. A two-wire path module can allow the CS 710 to control 200 or more additional stations.

In some embodiments, the irrigation controller 610 and/or irrigation controller 710 can be implemented through an irrigation controller as described in U.S. Pat. Nos. 7,640,079 and 7,444,207, each of which is incorporated herein by reference in their entireties.

Figure 8:
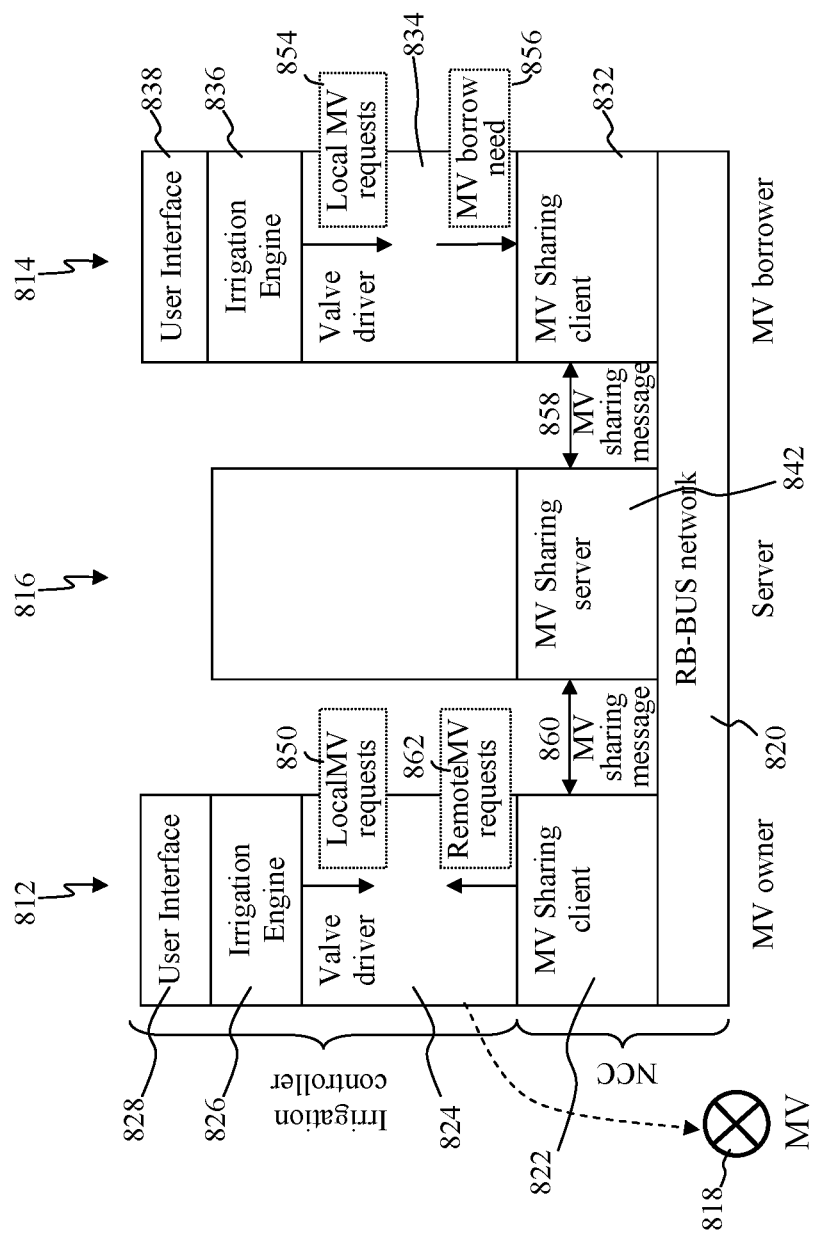
FIG. 8 depicts a simplified network and control layer diagram that further shows network messaging, according to some embodiments, illustrating communications between CSs and SS in the cooperative control of a master valve in an irrigation sub system.

FIG. 8 depicts a simplified network and control layer diagram that further shows network messaging, according to some embodiments, illustrating communications between CSs 812, 814 and SS 816 in the cooperative control of a master valve 818 in an irrigation sub-system. The CSs 812, 814 and SS 816 are in communication through a network 820, such as a network bus. The first CS 812 includes a master valve sharing client 822, a valve driver 824, an irrigation engine 826 and a user interface 828. Further, the first CS 812 is in direct control and/or physically coupled with the master valve 818, through the valve driver 824, and accordingly can be considered the master valve owner in some respects.

The second CS 814 is not in direct control of the master valve 818 and instead is a borrower of the master valve 818. Additionally, the second CS 814 similarly includes a master valve sharing client 832, valve driver 834, irrigation engine 836 and user interface 838. In some embodiments, the master valve sharing clients 822, 832 may be implemented through a communication interface 716 (e.g., NCC), and the valve drivers 824, 834, the irrigation engines 826, 836 and the user interfaces 828, 838 may be implemented through control panels 714 and control modules 718-720 of irrigation controllers, such as irrigation controller implementing the CS 710. The SS 816 includes a master valve sharing server 842.

In operation, when the irrigation engine 826 of the first CS 812 identifies, for example based on an irrigation schedule, that irrigation is to be implemented and that a state of the shared master valve 818 has to be changed (e.g., opened), the irrigation engine 826, in step 850, issues a local master valve command or request to the master valve driver 824. In response, the master valve driver 824 activates the master valve 818, in step 852, to open or otherwise to maintain the master valve in an open state so that water can be directed to those sprinklers or other irrigation water distribution devices 124 controlled by the first CS 812.

Similarly, when the second CS 814 identifies, for example based on an irrigation schedule at the second CS, that irrigation controlled by the second CS 814 is to be implemented and that the shared master valve 818 has to be open, the irrigation engine 836, in step 854, issues a master valve command or request to the master valve driver 834. In response, the master valve driver 834 identifies that the master valve 818 is a shared master valve and under direct control of another irrigation controller (i.e., first CS 812). Accordingly, the master valve driver 834 of the second CS 814 borrowing the master valve 818 issues a request, in step 856, to the master valve sharing client 832 that the shared master valve 818 be opened or otherwise maintained in an open state.

The master valve sharing client 832 issues, in step 858, a request to the SS 816 requesting that the shared master valve be opened or maintained open. The master valve sharing server, in step 860 and in response to the request, issues a command to the first CS 812 instructing the first CS 812 to open the master valve 818 or maintain the master valve in an open state. The master valve sharing client 822 of the first CS 812 identifies the command and issues a remote master valve command, in step 862, to the valve driver 824 instructing the valve driver to open the master valve 818 or maintain the master valve in an open state. Accordingly, the valve driver 824 of the first CS 812 opens the master valve 818 or maintains the master valve in an open state in step 852. As such, the borrowing CS (i.e., the second CS 814 in this example) can remotely control the shared master valve 818 through the SS 816.

Referring back to FIG. 1, the SS 112, as described above, provides information to the one or more CSs 113-116 regarding the status of shared resources within the irrigation sub-system 120 (e.g., states of shared master valves 134, state of sensor data or information from one or more shared sensors 136, and other relevant information). A master valve borrower CS (e.g., first CS 113) can cause the shared master valve 134 to be opened due to pending or active irrigation at the first CS 113 by communicating across the network or communication link 128 to the SS 112 that can cause the SS to open the shared master valve 134 or otherwise notifies another CS of the irrigation sub-system 120 to activate a shared master valve. Thus, the first CS 113 can activate the master valve 134 even though the first CS does not directly control the master valve and/or is not physically connected to the master valve.

The SS 112 can coordinate a relatively large number of CSs and the sharing of a relatively large number of master valves and/or sensors. For example, in some instances, a SS 112 can support 250 CSs or more within an irrigation sub-system 120. The SS and/or a CS, in some instances, can control multiple master valves (e.g., five or more master valves), with one or more of those master valves potentially being shared by one or more of the SS or other CSs. Similarly, the SS and/or CSs can cooperate with one or more sensors, and the sensor data can be shared between the SS and other CSs.

Accordingly, master valve and sensor sharing could result in a significant amount of network traffic and take a significant amount of time. In some instances, the resulting network traffic may exceed time limits (e.g., taking much longer to open a master valve) to provide effective operation and/or exceed time limits stated in implementation limitations.

Some embodiments may implement a polling by the SS 112 of each CS 113-116 individually. This can be effective and may not adversely affect the network bandwidth and/or traffic when the irrigation sub-system 120 is not too large. With larger irrigation systems 110 and/or irrigation sub-systems 120, the individual polling can saturate the available bandwidth of the communication network and slow down traffic between the central controller 126 and the SSs 112 and CSs 113-116, and/or between a SS 112 and the CSs 113-116 of an irrigation sub-system 120. In some instances, the resulting network traffic on networks of irrigation systems 110 and/or irrigation sub-systems 120 with relatively large numbers of devices (e.g., SSs, CSs, additional irrigation controllers, sensors, etc.) could interfere with or cause the amount of time needed to implement an effective synchronization/communication to download and/or upload information (e.g., settings, logs, status, commands, irrigation schedules, and the like) to and/or from SSs 112, CSs 113-116 and additional irrigation controllers 117-118 that the irrigation system 110 becomes impractical for effective use.

Further limits on bandwidth and/or latency may be defined as a result of synchronizing an irrigation system 110 and/or irrigation sub-system 120. For example, a central controller 126 may require that a certain number of satellite irrigation controllers be synchronized (e.g., current irrigation schedules be distributed) within a predefined period of time (e.g., synchronize 256 satellite irrigation controllers within 4 hours). This can impose minimum bandwidth carrying capacity and/or latency between the central controller 126 and a satellite irrigation controller on the communication network. Accordingly, non-central controller communication traffic may have to be limited and in some instances minimized to achieve the desired synchronization time. Further, the central controller 126 may additionally be configured to communicate with and force a satellite irrigation controller, substantially at any time of day and even during irrigation, to take certain action. Therefore, bandwidth may also be limited to provide some capacity to allow for these override communications. Still further, relatively long synchronization times may be expensive, for example, over a general packet radio service (GPRS) connection. Accordingly, it is can often be advantageous and/or financially beneficial to reduce the times the central controller 126 is connected.

As such, some embodiments attempt to reduce the network traffic needed with respect to at least master valve sharing and/or sensor sharing. These reductions allow both the master valve sharing and sensor sharing to be interleaved with traffic to or from the central controller 126 and potentially other communications without severely, adversely impacting either the bandwidth available for the central controller 126 or the response time in implementing the master valve sharing and sensor sharing. Some embodiments utilize an assumption broadcast (sometimes referred to as a poll notification), as described fully below, that dramatically reduces the network traffic in implementing the master valve sharing and sensor sharing, and further allows the central controller 126 to simultaneously synchronize the SSs 112, CSs 113-116 and other irrigation controllers 117-118 over an entire irrigation system 110.

Further, because of the potentially large numbers of CSs 113-116 within an irrigation sub-system 120, the communication of relevant master valve status information, master valve commands and sensor information can result in relatively large amounts of network communication traffic. Other communications typically are also implemented over the communication network 632, 634, such as irrigation schedules, operational status information, specific manual commands and/or instructions, and/or other relevant information. Further, some implementations are configured to operate at relatively low communication rates (e.g., communication baud rate of 38,400 bps (bits per second) or less). This can result from allowing irrigation sub-systems to be established in pre-existing or partially pre-existing irrigation systems, limiting costs (e.g., attempts to limit costs of user-installed wiring and limiting the complexity of wiring installation and termination), and/or other factors. Other implementations may utilize higher communication rates, but the lower expected communication rates establish limits that should be met in at least some implementations in order to provide accurate and reliable operation.

Accordingly, the irrigation system 110 typically has to allow synchronization of the irrigation system 110 to distribute irrigation scheduling from the central controller 126 and receive status information, alarms, events and the like at the central controller 126 within a limited range of time. In some embodiments, synchronization is restricted to be implemented in less than 10 hours with a system having 256 CSs, and in some instances less than five hours. Again, there may be additional financial benefit to an owner of the irrigation system 110 in reducing this time due, for example, to GPRS, phone or other networking charges.

Further, the communication system of the irrigation system 110 is further configured to typically allow this synchronization to occur while allowing other communications to take place within the communication network of the irrigation system 110, such as but not limited to the master valve sharing information and/or sensor sharing information. Additionally, to provide accurate irrigation implementation, response times to requests, status changes, sensor information and the like further impose limits on the network bandwidth usage. For example, in some implementations, an end-to-end performance of master valve sharing can be limited to be within 10 minutes most of the time, typically within five (5) minutes and in some instances within one (1) minute on average (e.g., a time delay from a borrowing CS needing a master valve opened to a time the master valve actually starts opening should be less than about one (1) minute). It is noted, that closing the master valve typically is not as urgent, but in some instances is complete within a similar time frame. Further, some embodiments provide for a network delay that allows for a 2-wire path communication delay, which can be approximately 10 seconds at an owner CS that directly controls a master valve.

Accordingly, some embodiments limit network communications. Further, some embodiments limit network communication through network broadcasts and/or assumption broadcasts issued from the SS 112. The SS 112, in some instances, can identify a current status of shared control elements as understood by the SS (e.g., a state of each master valve 134 and/or sensor 136) shared within the irrigation sub-system 120. With the status information the SS 112 can issue, for example, a master valve assumption broadcast that is received by each of the CSs 113-116 of the irrigation sub-system 120, either directly or through relaying through one or more CSs. As described above, each CS knows which master valve or valves it is directly controlling (if any) and which master valve or valves it is sharing (if any), for example, based on the master valve sharing configurations and/or mapping tables. As such, each CS can identify the status of the one or more master valves associated with the CS. In those instances where a state, as identified in the master valve assumption broadcast, of a master valve shared by but not directly controlled by a CS is inconsistent with a desired state, that CS can issue a reply to the SS 112 notifying the SS that the CS desires the state of the master valve be changed.

Additionally, in some implementations, when a state of a master valve directly controlled by a CS is inconsistent with an actual state that the CS knows the master valve is in, that owner or controlling CS can interpret the inconsistency as a command (e.g., another CS sharing the master valve is requesting the master valve be opened) and change the state of the master valve to be consistent with the assumed state designated in the assumption broadcast. Similarly, the owner CS may identify that the assumed state from the assumption broadcast is inconsistent with a state desired by the owner CS. As such, the owner CS can issue a response to the assumption broadcast notifying the SS 112 of the inconsistent state.

In response to one or more responses to an assumption broadcast, the SS 112 can update the status information so that subsequent assumption broadcasts have the altered status information, and/or in some instances the SS 112 could issue commands to one or more CSs to alter the state of a master valve. Similarly, CSs that are sharing a master valve can identify the state of those master valves. When the state of a shared master valve is consistent with a desired state based on the irrigation scheduling being implemented by a CS, the CS does not issue a response. Alternatively, when a state of a master valve is inconsistent with a desired state the CS can issue a response notifying the SS 112 that the state of the master valve is not consistent with the desired state.

The SS 112 can determine, based on the response to the assumption broadcast, whether a state of a master valve should be changed and store the changed state information to be used with subsequent assumption broadcasts. The SS 112 can issue subsequent commands, typically through the distribution of the subsequent assumption broadcast, instructing the CS directly controlling the master valve to change the state of the master valve. As such, the assumption broadcast can provide, to each CS of the irrigation subsystem 120 through a single broadcast, a notification of the state of the one or more shared control elements associated with each CS. This can provide rapid response time over the irrigation sub-system 120 allowing the SS 112 CSs 113-116 to rapidly response to the state information, and provides a speed advantage particularly in larger and/or more complex irrigation systems. Further, in some embodiments, every CS within an irrigation sub-system 120 can be polled with each assumption broadcast.

For example, referring to FIG. 2, the SS 112 can issue a master valve assumption broadcast that identifies assumed states of both the first and second master valves 212, 214 as well as assumed desired states corresponding to those CSs borrowing a master valve. The master valve assumption broadcast is received by the CSs 113-116 of the irrigation sub-system 120 and evaluated. In this example, the first CS 113 can evaluate the assumed actual state of the second master valve 214 and determine whether the state is consistent with a current state of the second master valve 214 (e.g., broadcast identifies that the second master valve is closed, and the first CS 113 determines whether the second master valve is actually in a closed state). When the assumed state of the second master valve 214 as identified in the broadcast is consistent with the actual state the first CS 113 does not issue a reply and does not take action to change the state of the second master valve. It is noted that the SS 112 performs a similar evaluation of state information when the SS 112 directly controls one or more master valves (e.g., first master 212) shared by one or more CSs 115-116.

Alternatively, when the first CS 113 identifies that the assumed state of the second master valve 214 is inconsistent with the current state (e.g., the assumed state identifies the second master valve as closed when in fact the second master valve is actually open), the first CS 113 interprets the difference in the assumed state as an instruction to change the state of the second master valve 214. In some instances, as a master valve owner, the first CS 113 determines, before implementing the instructed change, whether that change is inconsistent with a state needed by the first CS 113 (e.g., the instruction is to close the second master valve when the first CS 113 is implementing or will shortly be implementing irrigation). In those instances where the assumed state is inconsistent with the needs of the first CS 113, the first CS will issue a response to the assumption broadcast. Alternatively, the first CS 113, in response to the assumption broadcast changes the state of the second master valve 214 to be consistent with the assumed state designated in the assumption broadcast.

Similarly, the second CS 114 receives the same master valve assumption broadcast. The second CS 114 identifies the desired assumed state associated with the second CS 114 and evaluates the identified assumed state of the borrowed second master valve 214 relevant to the second CS 114 to determine whether the state of the borrowed second master valve is consistent with a state desired by the second CS 114. For example, the second CS 114 can identify that it is attempting to implement irrigation and/or it is scheduled to implement irrigation in the near future. When the second CS 114 determines that the specified assumed state corresponding to the master valve shared by the second CS 114 is consistent with its desired state or pending desired state no reply is issued by the second CS 114. Alternatively, when the state of the master valve is not consistent with the desired state the second CS 114 issues a reply to the master valve assumption broadcast notifying the SS 112 that the state of the second master valve 214 is inconsistent with a desired state, and effectively requesting that the state of the second master valve be changed. The SS 112 can perform a similar evaluation when the SS shares a master valve directly controlled by a CS.

When a reply is received at the SS 112 (for example, a reply from the second CS 114), the SS identifies the relevant master valve and evaluates the identified inconsistent state to determine whether to change the status information and/or whether to issue a command requesting that the state of the shared master valve be changed (e.g., a subsequent assumption broadcast or a command to the first CS 113 instructing that the first CS change the state of the master valve, such as from a closed state to an open state). In some embodiments, the SS 112 uses the master valve sharing configurations and/or mapping tables in identifying which CS is the relevant master valve owner and how to designate the requested change (e.g., identifying which one or more bits in an assumption broadcast are to be modified).

The SS 112 can issue subsequent commands to those CSs (e.g., first CS 113) to change the state of a master valve when the SS determines that the actual state of the shared master valve (e.g., second master valve 214) should be changed to comply with a desired state from the SS or another CS (e.g., to comply with the desired state as identified by the second CS 114 and the irrigation scheduling being implemented by the second CS 114). In many embodiments, the command to the owner CS (e.g., first CS 113) is implemented through a subsequent assumption broadcast that identifies the changed state specified by the borrower CS (e.g., second CS 114).

In some embodiments, the assumption broadcast identifies the assumed actual states of the master valve(s) corresponding to master valve owner CSs 112 and 113 and also identifies the assumed "master valve borrower need" states of the borrower CSs (e.g., second CS 114). Accordingly, master valve owner CSs 112 and 113 evaluate the assumption broadcast against the actual state of the master valve. The master valve borrower CSs (e.g., second CS 114) evaluate the assumption broadcast against the need for the borrowed master valve to be opened. The borrower CS may not know, and in many instances does not need to know, which master valve it is borrowing. Instead, the borrower CS identifies the state information relevant to that CS in determining whether a response to the assumption broadcast should be transmitted. The SS 112 processes the need requests against the mapping tables to determine which master valve owner CSs should be notified to change the state of a master valve. As such, in many embodiments master valve borrower CSs have their own assumption state information in an assumption broadcast because different CSs may have different needs, and the SS 112 can combine (OR) the desired states to determine whether a CS needs a change of state (e.g., needs a master valve open), which becomes the new assumption state.

Accordingly, the use of the assumption broadcast can reduce network traffic because replies are limited to instances when inconsistent states are identified. When the assumption broadcasts are regularly issued, the states are typically relatively consistent over time with minimal inconsistent states and/or changes due to the desired state of the SS 112 and/or replies from the CSs 113-116. Additionally, a single assumption broadcast provides both the communication of state information and initiates responses for inconsistent or incorrect states. Further, with the use of the assumption broadcasts, an SS does not have to issue direct commands to change the states of control elements, but instead allows the CSs 113-116 to determine whether the CS should react and/or make changes. The SS can still be configured with the capability to issue direct commands. The use of the assumption broadcasts, however, can reduce and in some instances eliminate the need to issue direct commands.

In some embodiments, the amount of data communicated through the assumption broadcast can be reduced by utilizing a predefined format and/or arrangement of the information defined within the assumption broadcast. A format and/or scheme for the master valve assumption broadcast can be implemented that allows the CSs 113-116 to quickly ascertain whether a state change of a master valve needs to occur. For example, the assumption broadcast can include a series of a plurality of bits, where a single bit in the broadcast corresponds to the assumed state of a master valve corresponding to each CS 113-116. As described above, when the CS (e.g., second CS 114) agrees with the assumption the CS does not respond to the assumption broadcast. Alternatively, when a CS disagrees with the assumption it communicates a reply with a corrected assumption.

Figure 9:
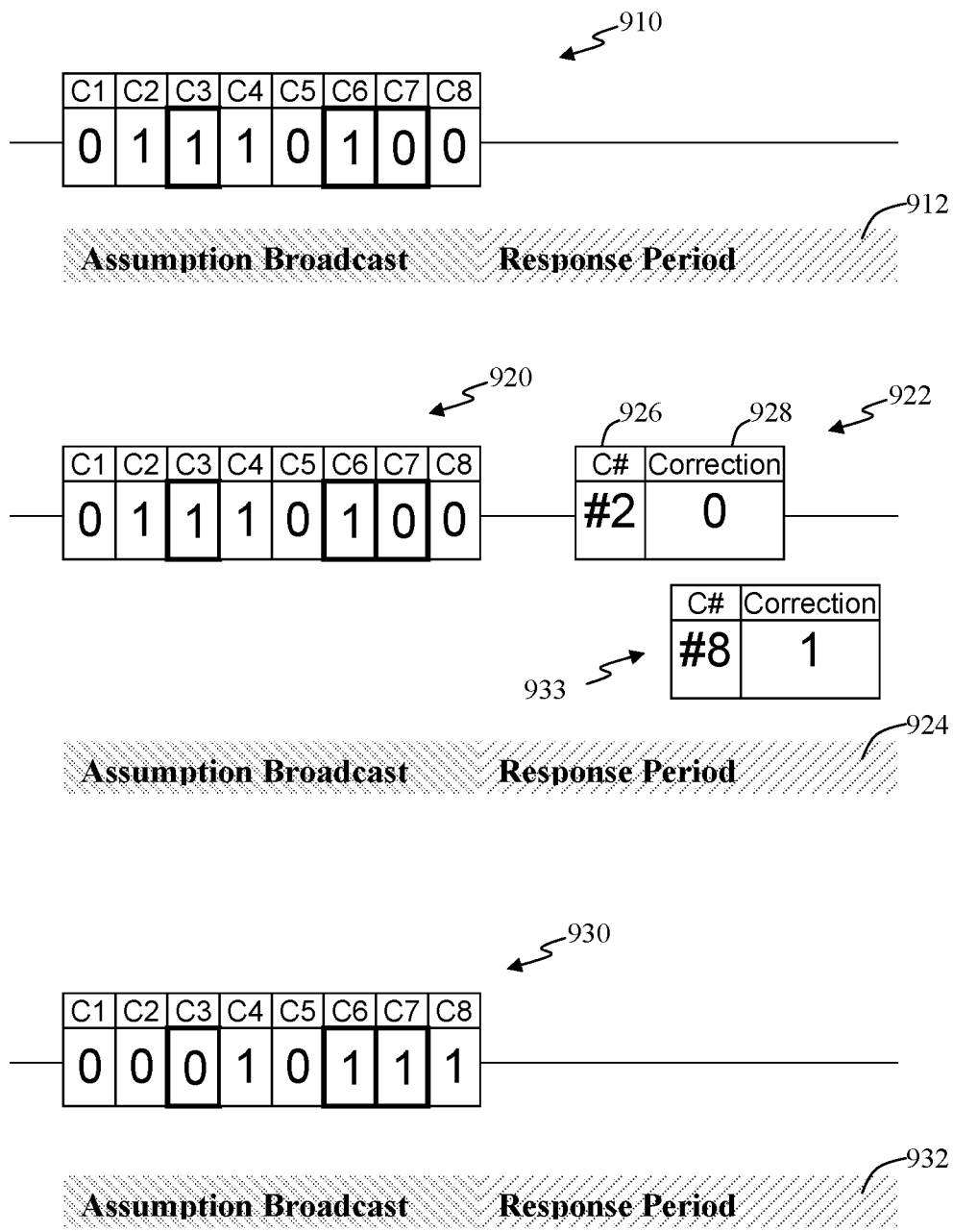
FIG. 9 depicts a simplified block diagram of an example of at least a partial sequence of master valve assumption broadcasts each comprising a bitmap representation of a series of bits of at least a portion of the assumption broadcasts.

FIG. 9 depicts a simplified block diagram of an example of at least a partial sequence of master valve assumption broadcasts each comprising a bitmap representation of a series of bits of at least a portion of the assumption broadcasts. For simplicity, the example of FIG. 9 is presented with assumed states corresponding to eight CSs (C1-C8). However, an irrigation sub-system further includes a SS, which is not represented in FIG. 9, and further an irrigation sub-system can include more or fewer CSs. Further in this example, the third CS (C3), sixth CS (C6) and the seven CS (C7), as identified in FIG. 9 by the highlighted borders, correspond to CSs that each directly controls a master valve that is shared by one or more of the other CSs (i.e., C1-C2, C4-C5 and C8). For example the first through third CSs (C1-C3) share the master valve controlled by the third CS (C3), the fourth through sixth CSs (C4-C6) share the master valve controlled by the sixth CS (C6), while the seventh and eights CSs (C7-C8) share the master valve controlled by the seventh CS (C7). Additionally, in this representation, a "1" bit represents an assumed state that the corresponding shared master valve should be in the open state, while a "0" bit represents an assumed state that the corresponding shared master valve should be in the closed state. In some instances, the state information may be represented by more than a single bit.

The SS 112 broadcasts a first assumption broadcast 910. In the example of FIG. 9, the first assumption broadcast 910 identifies the assumption that both the second CS (C2) and the fourth CS (C4) need their respective shared master valve in an open state. Further, the third CS (C3) directly controlling the master valve shared with the second CS (C2) is further designated with a "1" bit representing an assumed state that the third CS (C3) has directed the master valve to be in an open state. Further, the sixth CS (C6) directly controlling the master valve shared with the fourth CS (C4) is further designated with a "1" bit representing an assumed state that the sixth CS (C6) has directed the master valve to be in an open state. Still further, the seventh CS (C7) directly controlling the master valve shared with the eighth CS (C8) is designated with a "0" bit representing an assumed state that the seventh CS (C7) has directed the master valve to be in a closed state. Additionally, in some embodiments the assumption broadcast 910 is used by the SS 112 and the assumption bits reserved for those CSs that directly control a master valve (owner CS) to broadcast a command to those owner CSs to open or close the shared master valve. Accordingly, in the example of FIG. 9 the shared master valves directly controlled by the third CS (C3) and the sixth CS (C6) are requested open. The SS 112 can utilize the master valve sharing configurations and/or mapping tables, which typically are received from the central controller 126, to map the borrow requests from borrowing CSs (e.g., second and fourth CSs (C2, C4)) to the owner CSs (e.g., third and sixth CSs (C3, C6), respectively).

When the assumed states are true (correct) as interpreted by the corresponding CSs then no responses are generated by the CSs during the response period 912. Assuming that this is the case at the time the first assumption broadcast 910 is transmitted, when the SS 112 is to transmit a subsequent second assumption broadcast 920 the SS 112 broadcasts the same assumption bitmap. Accordingly, in this example, none of the CSs response to the first assumption broadcast 910.

Should the implementation of irrigation through the second CS (C2), however, complete after the first assumption broadcast 910 but prior to the second assumption broadcast 920, it is likely that the second CS (C2) no longer needs the corresponding shared master valve in the open state. Accordingly, the second CS (C2) sends a response 922 to the second assumption broadcast 920 during a response period 924 of the second assumption broadcast 920. In some instances, the response 924 includes an identifier 926 of the second CS requesting the correction and a corrected state 928, which may be designated in some embodiments through a single bit. Similarly, the eighth CS (C8) may identify that irrigation is to be activated in accordance with an irrigation schedule at the eighth CS. As such, the eighth CS (C8) generates a response 923 identifying the requested change of state of master valve shared by the eighth CS (in this example, the master valve directly controlled by the seventh CS). Further, in some embodiments, the response additionally may include an identifier that associates the response with the corresponding assumption broadcast to which the CS is responding. For example, the assumption broadcast may include an identifier that can be extracted and used by the CS in the response.

The SS 112 receives the responses 922, 923. The assumed states corresponding to the second CS (C2) and the eighth CS (C8) are adjusted to reflect the correction. Further, the SS 112 evaluates the states of the CS (or SS) that directly controls the master valve shared by the second and eighth CSs (C2, C8) (i.e., the third and seventh CSs (C3, C7), respectively) and the assumed states of any other CSs and/or SS that share the master valve shared by the second CS (C2) (e.g., first and third CSs (C1, C3)) and shared by the eighth CS (C8) (e.g., seventh CS (C7)) to determine whether the states of the corresponding master valves should be changed. For example, when it is determined that the first and third CSs (C1, C2) sharing the master valve also shared by the second CS (C2) need the shared master valve in the open state, the SS 112 alters the assumption state corresponding to the third CS (C3) that controls the master valve shared by the second CS (C2). Further, the SS 112 determines the CS controlling the master valve shared by the eighth CS, in this example the seventh CS (C7), alters the state corresponding to both the seventh and eighth CSs. As such, when the SS 112 communicates a subsequent third assumption broadcast 930 following the second assumption broadcast 920 that third assumption broadcast will reflect the changes in assumed states corresponding to the second, third, seventh and eighth CSs.

The bitmap representation of the third assumption broadcast 930 comprises a series of bits corresponding to the updated assumptions based on the responses 922, 923 received in reply to the second assumption broadcast 920. Again, based on the responses 922, 923, the SS 112 identifies that the response 922 is from the second CS (C2), and further identifies the corrected state 928. The third assumption broadcast 930 reflects the changed assumed state of the second CS (C2) that the second CS (C2) no longer needs the shared master valve open (e.g., a "0" bit designation). Further, third assumption broadcast 930 reflects the changed assumed state corresponding to the third CS (C3) designating the master valve controlled by the third CS (C3) is in the closed state (e.g., a "0" bit designation). This assumed state can further represent a command to the third CS (C3) to change the state of the shared master valve if the third CS (C3) determines that the master valve is still in the open state. Further, the third CS (C3) may, in some instances, additionally confirm that the third CS (C3) does not need the master valve directly controlled by the third CS (C3) to be in an open state, and thus confirming that the assumed state designated in the third assumption broadcast 930 is consistent with the third CS's desired state for the master valve. In some embodiments, the owner CS may disregard the "command" in the assumption broadcast and instead issue a response to the assumption broadcast when a designation is inconsistent with the owner CS's desired state of the master valve.

Similarly, the seventh CS (C7) detects the change in state as defined in the third assumption broadcast and activates the master valve to transition to the open state. The eights CS (C8) also identifies the changed state corresponding to the seventh and eighth CSs (C7, C8) as confirmation the master valve is opened, as well as the changed state corresponding the eights CS and accordingly does not transmit a response during the response time 932.

Additionally, those CSs (e.g., the third, sixth and seventh CSs (C3, C6, C7)) and/or the SS that directly control a master valve (or other control element) typically do not have to wait for the assumption broadcast to confirm a state of the master valve. Instead, the CSs (C3, C6, C7) and/or SS that directly control the master valve can, in some embodiments, directly change the state of the master valve in accordance with irrigation scheduling being implemented through the master valve owner CS or SS. Further, a CS (e.g., the sixth CS (C6)) or SS that directly controls a master valve (or other relevant control element) can issue a response to an assumption broadcast when the state of the master valve is not consistent with the state of the master valve directly controlled by and as a result of the CS (e.g., sixth CS (C6)) directly changing the state based on a locally implemented irrigation scheduling instruction. The SS can then update the state information for use with subsequent assumption broadcasts so that other CSs are aware of the accurate current state of the master valve (or other control element).

Although FIG. 9 is presented in a configuration with each bit being associated with a different CS, in some instances, a CS may share more than one master valve 134 and accordingly two or more bits within the assumption broadcast may be associated with a single CS, each identifying a state of one of the two or more bits designating a state of the two or more master valve shared by the CS. Further, in some embodiments, more than a single bit may be used to designate the state of the master valve (or other control element when relevant), and as such a sequence of two or more bits may be associated with a single CS.

In some embodiments, the frequency of the transmission of the assumption broadcasts is configured to limit delays and accordingly limit adverse affects to the resulting implementation of scheduled irrigation while avoiding overloading the communication network. For example, the delay associated from a borrower CS needing a master valve opened to the time the master valve actually starts opening can reduce the amount of water actually delivered when the borrower CS activates irrigation at the time scheduled even though the master valve is not opened. Accordingly, some embodiments attempt to limit delays by provide the assumption broadcasts at relatively short intervals. For example, some embodiments attempt to achieve an end-to-end performance of master valve sharing that is within approximate ten (10) minutes, while other embodiments attempt to achieve performance within approximately one (1) minute or less for most instances. In other words, from a time of the borrower CS needing a master valve opened to a time the master valve actually starts opening is approximately 1 minute or less with embodiments configured to achieve an end-to-end performance of approximately one minute. Closing the master valve typically is not as urgent and in some instances may have a slower end-to-end performance, but in many instances may be complete within a similar time frame. In many implementations, one (1) minute is generally not a large enough delay in response to have a significant effect on the total amount of water delivered during scheduled irrigation.

Some embodiments additionally take into consideration 2-wire path communication delay, which in some instances may be approximately 10 seconds at a master valve owner CS. Accordingly, in the embodiments attempting to obtain a one minute end-to-end performance, the frequency of master valve assumption broadcasts is configured such that end-to-end performance is approximately about 50 seconds in most instances to allow for the potential approximate additional 10 second delay that might result from a 2-wire path communication delay.

The assumption broadcast can, in some embodiments, additionally include assumptions about sensor information. Alternatively, the SS 112, in some embodiments, can generate and communicate a sensor assumption broadcast based on information received from one or more CSs that directly communicate with a sensor 136 (a sensor owner CS). The sensor sharing implements principles that are similar to the principles for master valve sharing. In some embodiments, however, the sensor sharing is used to disseminate control, and in some instances can further be used to collect updated state information. Further, the sensor broadcast messaging may also happen on a more relaxed timescale than on a master valve assumption broadcast.

The SS 112 can broadcast the currently assumed states of one or more sensors 136 of the irrigation sub-system 120 that are in direct communication with one of the SS 112 or CSs 113-116 of the irrigation sub-system (sensor owners). Each of the SS 112 and CSs 113-116 that share a sensor 136 not in direct communication with the SS or CS (a sensor borrower) can be configured to examine the sensor assumption broadcast and act accordingly. Each sensor owner SS or CS communicates a response to the sensor assumption broadcast updating sensor status information maintained at the SS 112 or the central controller 126 when the sensor assumption broadcast disagrees with an actual state of sensor information known to the sensor owner SS or CS. In some embodiments, sensor assumption broadcast can be configured with one bit per sensor, which is used to disseminate the sensor state and/or status. One or more of the SS 112 and/or CSs 113-116 may borrow against one sensor. Each bit in the assumption broadcast maps directly to one shared sensor on one owning SS 112 or CS (e.g., second CS 114).

Figure 10:
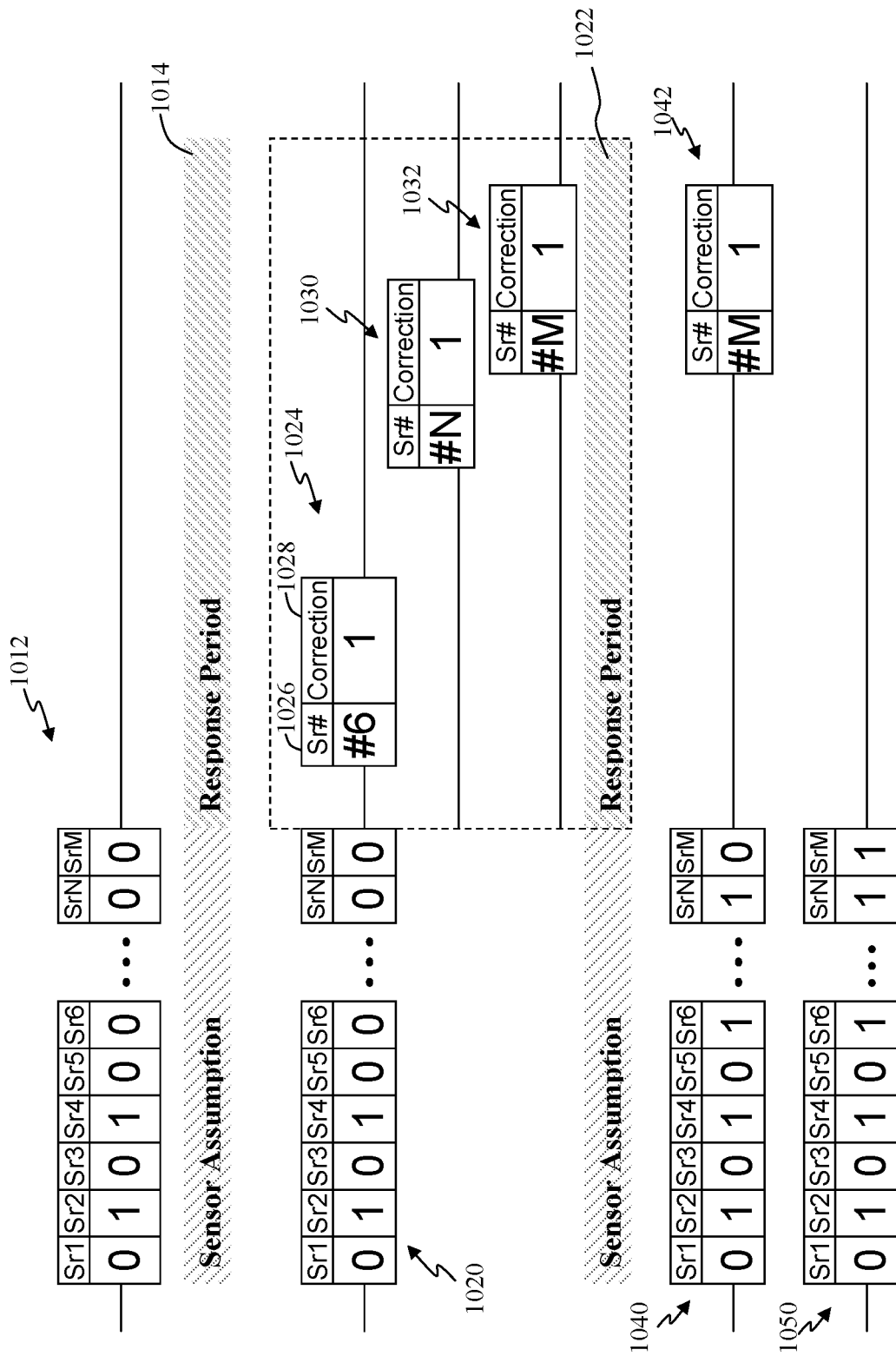
FIG. 10 depicts a simplified block diagram of example bitmap representations of a series of sensor assumption broadcasts according to some embodiments.

FIG. 10 depicts a simplified block diagram of example bitmap representations of a series of sensor assumption broadcasts according to some embodiments. A first sensor assumption broadcast 1012 is issued by the SS 112 that identifies state and/or status information corresponding to multiple sensors (M sensors) within an irrigation sub-system 120. The SS 112 and each CS 113-116 that shares a sensor utilize the information or states corresponding to one or more sensors from the sensor assumption broadcast in determining whether to take action and/or modify irrigation to be implemented in accordance with a locally implemented irrigation schedule. For example, a second sensor (Sr2) can be a rain sensor that generates a notification when a rain threshold has been exceeded, and communicates that notification to an owner CS (e.g., second CS 114). A "1" bit within the bitmap of the sensor assumption broadcast can indicate a certain state, such as the rain threshold being exceeded, while a "0" bit can indicate a threshold has not been exceeded. Accordingly, a CS receiving the sensor assumption broadcast can identify that the second sensor (Sr2) indicates an amount of rainfall has exceeded a threshold, and may adjust, interrupt or prevent scheduled irrigation. The SS and/or one or more CSs may share multiple sensors. Accordingly, the SS and/or the CSs may consider multiple bits within the assumption broadcast.

Further, each CS 113-116 that directly couples with a sensor (a sensor owner) further evaluates the first sensor assumption broadcast 1012 to confirm that the assumed states of their owned sensors is consistent with the actual sensor state communicated to and known to the SS or CS. In those instances where the sensor state in the sensor assumption broadcast is inconsistent, the owner CS 114 communicates a response notifying the SS 112 of the inconsistency.

Still referring to FIG. 10, the first sensor assumption broadcast 1012 identifies, for example, that a second sensor (Sr2) and a fourth sensor (Sr4) indicate that rain measured at these sensors has exceeded thresholds at each sensor. The sensors are not limited to rain, and instead can represent other information, such as but not limited to temperature, soil moisture, ET data and/or other relevant information. Again, each sensor owner CS evaluates the state information to determine whether the assumed state is consistent with a current state of the sensor as communicated to the owner CS.

When the assumed states are true (correct) as interpreted by the owner CSs then no responses are generated by any of the CSs during a response period 1014. In this example, it is assumed that this is the case at the time the first sensor assumption broadcast 1012 is transmitted. Accordingly, a subsequent second sensor assumption broadcast 1020 communicated from the SS 112 at a later time provides the same assumption bitmap. The sensor owner CSs evaluate the states of the sensor information and generate a response when the states are inconsistent with current information.

For example, assuming that the state information for a sixth sensor (Sr6), and Nth sensor (SrN) and an Mth sensor (SrM) have changed between the communication of the first sensor assumption broadcast 1012 and the second sensor assumption broadcast 1020. Accordingly, each owner CS that is directly coupled to one of the sixth sensor (Sr6), Nth sensor (SrN) and/or Mth sensor (SrM) evaluate the assumed sensor state and identify the inconsistencies. Accordingly, a first response by an owner CS directly coupled with the sixth sensor (Sr6) generates a response 1024 during the response period 1022. For example, the response may include a sensor identifier 1026 for the sixth sensor and a correction bit 1028 indicating the correct state of the sixth sensor. Similarly, the CS directly coupled with the Nth sensor (SrN) communicates a response 1030 during the response period 1022 identifying the corrected state, and the CS directly coupled with the Mth sensor (SrM) communicates a response 1032 during the response period 1022 identifying the corrected state. Further, in some embodiments, the response may additionally include an identifier that associates the response with the corresponding sensor assumption broadcast to which the CS is responding, such as including an identifier from the second sensor assumption broadcast 1020.

The SS 112 receives the one or more responses 1024, 1030 and/or 1032 and makes appropriate changes in the assumptions states. Accordingly, when a subsequent third sensor assumption broadcast 1040 is communicated following the second sensor assumption broadcast 1020, the subsequent third assumption broadcast 1040 includes the updated sensor state information for those responses accurately received by the SS 112. It is noted that in some instances a response may not accurately be received, such as due to noise, a result of a communication collision over the network or other such factors. As such, in those instances where a response, such as response 1032 from the CS directly coupled with the Mth sensor (SrM), is not accurately received, a subsequent sensor assumption broadcast again includes the incorrect state information corresponding to the Mth sensor.

For example, still referring to FIG. 10, following the second sensor assumption broadcast 1020 the SS 112 communicates at a later time (e.g., periodically) a third sensor assumption broadcast 1040. In this example, the response 1024 corresponding to the sixth sensor (Sr6) was received and the state information corresponding to the sixth sensor (Sr6) has been modified (i.e., identifying a "1" bit). Similarly, the response 1030 corresponding to the Nth sensor (SrN) was received and the third sensor assumption broadcast reflects the update to the Nth sensor (SrN). The response 1032 corresponding to the Mth sensor (SrM), however, was not accurately received (e.g., due to a collision). Accordingly, the SS 112 did not update the state information corresponding to the Mth sensor (SrM) and the third sensor assumption broadcast 1040 maintained the previous state information for the Mth sensor (SrM) (i.e., designating a "0" bit").

The CSs directly coupled with the sixth sensor (Sr6) and the Nth sensor (SrN) confirm that the state of the sixth and Nth sensors, respectively are consistent with the states known at the CSs, and as such do not transmit responses. The CS directly connected with the Mth sensor (SrM), however, identifies again that the state information corresponding to the Mth sensor (SrM) is still inconsistent. Accordingly, the CS directly coupled with the Mth sensor (SrM) communicates a response 1042 identifying the Mth sensor and the change in state.

Upon accurately receiving the response 1042 to the third sensor assumption broadcast 1040, the SS 112 updates the relevant state information corresponding to the Mth sensor. A subsequent fourth sensor assumption broadcast 1050 now accurately reflects the current states of the Mth sensor (i.e., a "1" bit) as well as the states for the first through the Nth sensors. As such, no responses are communicated in reply to the fourth sensor assumption broadcast 1050.

Some embodiments further attempt to limit the delays between a sensor changing states and/or supplying sensor information and the time a CS not directly connected to but sharing that sensor receives the updated sensor information. In many embodiments, however, the delay associated with updating sensor data is less critical than updating information associated with some other control elements, such as master valves. Accordingly, the time between sensor assumption broadcasts may be greater than the time between master valve assumption broadcasts. For example, some embodiments attempt to obtain an end-to-end performance of sensor sharing (a time when a sensor owner CS receives a notice from the sensor of a sensor transitioning from active to inactive (or vice-versa) to the time a sharing CS receives the changed state information and takes appropriate action) that is less than 2 hours, and in many embodiments to be within approximately 10 minutes most of the time. Further, some embodiments additionally allow for 2-wire path communication delays, which are often approximately 10 seconds at the sensor borrower CS.

Although FIG. 10 is presented in a configuration with each bit being associated with a sensor, in some instances, two or more bits may define the sensor state and/or information. Similarly, the response from a CS (e.g., response 1024) may include two or more bits to define the corrected sensor state or corrected sensor information.

As introduced above, the responses to assumption broadcasts may not all be accurately received. In many instances, if not in most instances, there will be no responses to sensor assumption broadcasts. If a relatively large number of sensors, however, change their status at approximately the same time (e.g., due to rain) there could be heavy traffic in response to a sensor assumption broadcast, which can result in collisions. Again, a collision between two or more responses may prevent the accurate reception at the SS of one or more of the two or more responses. Some embodiments, however, employ back-offs and/or retries in attempts to compensate for potential communication failures. Further, collisions are expected to rapidly decrease between successive assumption broadcasts because the number of responses should decrease as a result of some of the responses being received.

Figure 11:
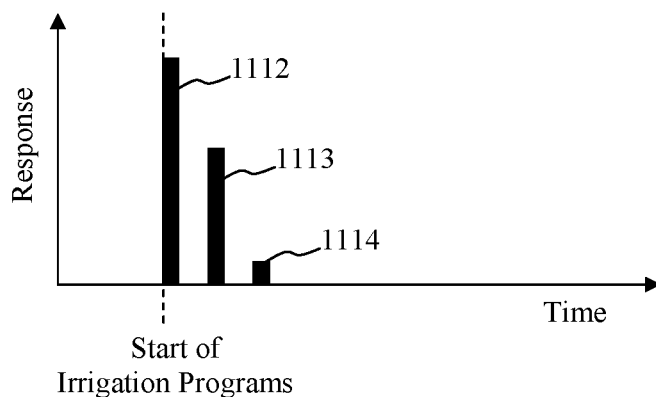
FIG. 11 depicts a simplified graphical representation of a fall-off of expected numbers of responses over time in response to sequential assumptions broadcasts.

FIG. 11 depicts a simplified graphical representation of a fall-off of expected numbers of responses 1112-1114 over time in response to sequential assumptions broadcasts. As introduced above, in some instances responses may not be accurately received by the SS 112. The number of inaccurately received responses may increase as the number of CSs 113-116, master valves 134 and/or sensors 136 of an irrigation sub-system 120 increase, which can result in an increased likelihood of communication collisions over the network. The number of collisions, however, should decrease with each successive assumption broadcast as the number of inconsistent states is expected to decrease as a result of received responses to previous assumptions broadcasts. Typically, there will be no or minimal numbers of responses to assumption broadcasts. If a large number of sensors and/or CSs change their states at approximately the same time there could be heavy traffic in response to an assumption broadcast, which could result in noise, collisions and the like that can decrease the likelihood that all of the responses are accurately received by the SS 112.

Typically, however, at least one and often more than one response will get through and be accurately received by the SS 112. Further, some embodiments employ tactics to increase the likelihood that responses are accurately received by the SS, as described more fully below. As such, the SS 112 implements changes to the state information correcting assumptions, and subsequent assumption broadcasts result in fewer inconsistencies. Accordingly, each subsequent assumption broadcast should include fewer inconsistencies resulting in fewer responses 1112-1114 until all of the inconsistencies are addressed.

It is possible that all CSs that detect an incorrect assumption could attempt to respond to an assumption broadcast at the same time. This could cause collisions, such as on an RS-485 segment of the communication network 632, and could potentially lead to few or even no responses being read correctly by the SS 112. Some embodiments, however, implement a response timed back-off or delay before a CS transmits a response to an assumption broadcast. Further, the time corresponding to each back-off can vary.

Figure 12:
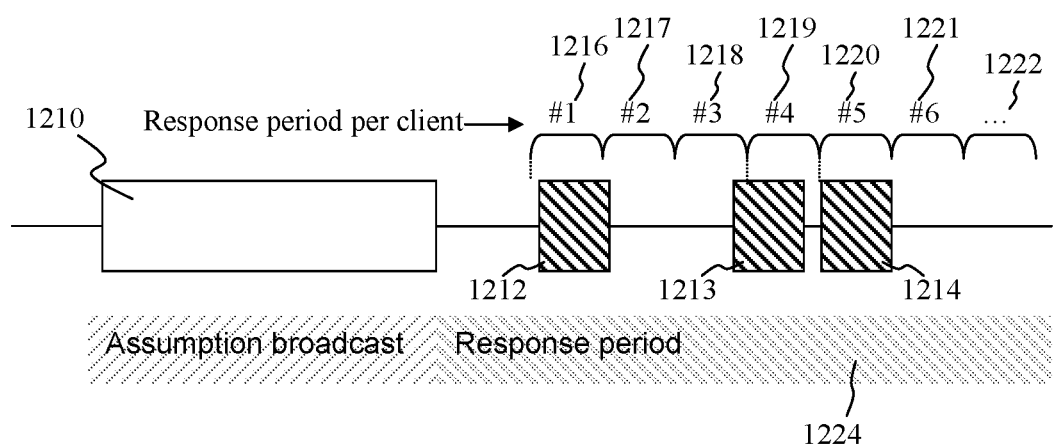
FIG. 12 depicts a simplified graphical representation of implemented timed back-off responses.

FIG. 12 depicts a simplified graphical representation of implemented timed back-off responses. As described above, an assumption broadcast 1210 is communicated from the SS 112 to the CSs 113-116 of the irrigation sub-system 120. In this example, the first, fourth and fifth CSs identify inconsistencies in the assumptions of the assumption broadcast 1210. Accordingly, as described above, the first, fourth and fifth CSs will attempt to transmit a response 1212-1214 to the assumption broadcast during the response period 1224. Some embodiments, however, implement timed back-offs. Accordingly, each CS is provided a timed back-off slot or period 1216-1222. As such, each CS that intends to transmit a response initiates the transmission in correspondence with the timed back-off period. For example, the first CS may have no or only a minimal timed back-off period 1216 in which a response 1212 is to be transmitted. The fourth CS, however, would have a greater timed back-off 1219, while the fifth CS would have an even greater timed back-off. As such, it is less likely that two CSs are attempting to transmit a response at the same time.

The timed back-off periods can be predefined based on an equation or other such timing. In some embodiments, the back-off may be based on a CSs address over the communication network. In some implementations, each CS 113-116 determines a back-off by multiplying a CS address by a fixed amount of time (e.g., 5 ms). It is noted that FIG. 12 reflects potential jitter or incorrect timing of the start of at least some responses. This can occur, for example, when the CSs 113-116 are not synchronized or are not precisely synchronized. Additionally, in many implementations the precision of the clocks of the CSs is not critical and/or the back-off periods 1216-1222 do not need to be accurate enough to ensure there are no collisions. Instead, the back-off periods are implemented to reduce the likelihood of collisions. The expected number of responses in cooperation with the timed back-off, however, still significantly reduces the likelihood of potential collisions, and as described above, the numbers of collisions typically rapidly decrease between successive assumption broadcasts. Additionally or alternatively, some embodiments may back up each response to an assumption broadcast by each CS so that it is further is less likely a collision will occur.

The sensor assumption broadcast is typically broadcast by the SS 112 multiple times a day, and in many instances is broadcast periodically. Similarly, the master valve assumption broadcast is typically broadcast by the SS 112 multiple times a day (e.g., periodically). The states of the master valves, however, are generally more critical to the irrigation system 110 than the statuses and/or states of sensors because irrigation cannot be implemented until corresponding shared master valves are open to allow water to flow to those irrigation devices and/or stations controlled by a CS. Accordingly, in some embodiments the master valve assumption broadcasts are broadcast more frequently than the sensor assumption broadcasts. For example, the master valve assumption broadcasts may be broadcast once every 5 minutes, once every minute or even less (e.g., once every 10 seconds). The duration between master valve assumption broadcasts, in some instances, may vary based on, such as but not limited to, network traffic, numbers of CSs in the irrigation sub-system, number of shared master valves 134 and the like. Similarly, the sensor assumption broadcast may be transmitted once a day, once every hour or less (e.g., once every 5 or 10 minutes). Again, the duration between sensor assumption broadcasts may vary.

With the two assumption broadcasts, in many instances, each broadcast may include an identifier, for example in a header, that allows the receiving CSs 113-116 to identify the broadcast and properly evaluate the information provided. Additionally or alternatively, in some instances, the sensor assumption broadcast may be broadcast as part of and/or concatenated with the master valve assumption broadcast. Again, identifiers can be included in the single broadcast to allow the receiving CSs 113-116 to accurately distinguish between the assumed state information.

As described above, the use of the assumption broadcasts can, in some instances, introduce delays between when a change in state of a control element is requested and/or detected (e.g., irrigation is scheduled) and when actions are actually taken (e.g., when irrigation is actually activated). For example, referring to FIG. 1, there may be a delay between a time when a CS (e.g., second CS 114) identifies that irrigation is to be activated and a time when a master valve 134 shared by the second CS 114 is actually opened supplying water to the water distribution device(s) 124. Accordingly, if the second CS 114 activates an irrigation valve or station 122 in accordance with the locally stored irrigation schedule at the scheduled time no water may actually be delivered to the water distribution devices 124 for some delayed period of time until the master valve 134 shared by the second CS 114 is actually opened. For example, this delay can result from the sum of a first delay between the time the second CS 114 activates the irrigation valve 122 and a time when an assumption broadcast is received designating that the shared master valve is closed, a second delay between a time the second CS 114 transmits a response to the assumption broadcast and a time of a subsequent assumption broadcast that designates the shared master valve is in an open state, and a third delay between the time the subsequent assumption broadcast is transmitted and the owner SS or CS (in the example of FIG. 1, the SS 112) receives the subsequent assumption broadcast, identifies the changed state and causes the shared master valve to be opened.

When the delay is not significant relative to duration of the scheduled irrigation runtime the delay in some instances may be ignored. For example, if the total delay between time of activating irrigation and the actual delivery of water is less than 5% of the scheduled irrigation runtime, or in some instances less than 10% of the scheduled irrigation runtime, the delay may be ignored. Alternatively, however, in some instances the resulting delay may have a significant adverse affect on the irrigation, such as when the periods between assumption broadcasts is significant relative to a duration of the scheduled irrigation, which can result in the amount of water actually delivered being significantly less than the amount of water scheduled to be delivered.

Accordingly, some embodiments implement an irrigation pause that is maintained by a CS until a confirmation is received, typically through an assumption broadcast, that a shared master valve is open and irrigation can be implemented effectively. This pausing can limit adverse affects that may results from the delays. Further, irrigation runtimes are maintained and the amount of water actually delivered is consistent with the intended amounts based on the irrigation scheduling. It is noted that activations of subsequent irrigation valves 122 or stations may also be delayed as a result of the pause, such as in those instances where overlapping the activation of irrigation valves would result in an adverse decrease in pressure in the irrigation system 110.

Figure 13:
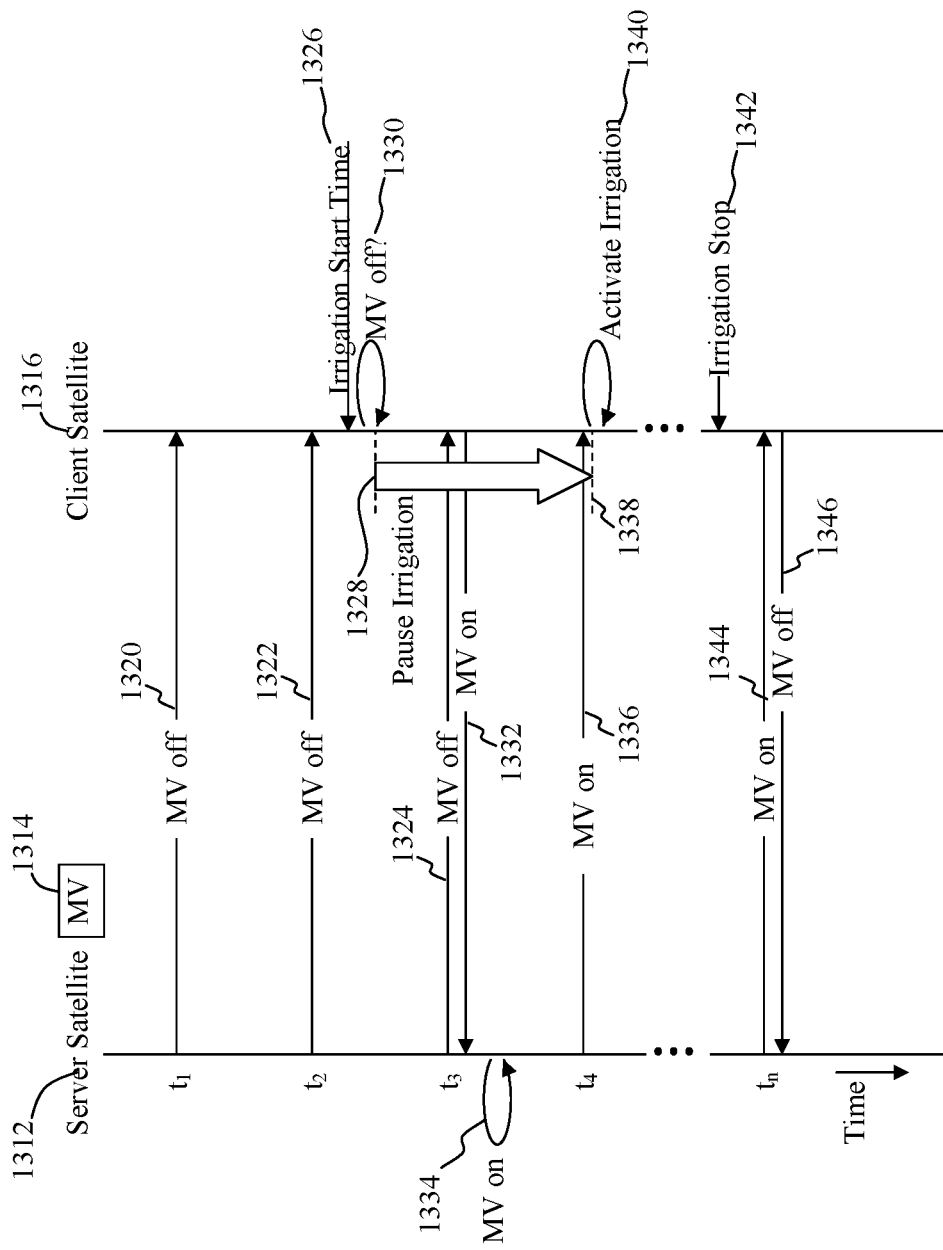
FIG. 13 depicts a simplified graphical representation of a process of implementing an irrigation pause according to some embodiments.

FIG. 13 depicts a simplified graphical representation of a process of implementing an irrigation pause according to some embodiments. In this example, a SS 1312 directly controls a master valve 1314 that is shared by a CS 1316. The SS 1312 issues at time $t_1$ a first master valve assumption broadcast 1320. At time $t_1$ the CS 1316 agrees with the assumed state of the master valve 1314 (e.g., the state is assumed closed and the CS 1316 is not scheduled to implement irrigation at time $t_1$), and as such does not transmit a response.

At time $t_2$ the SS transmits a second assumption broadcast 1322 that again indicates the master valve 1314 is closed. Again, no response is transmitted as the CS 1316 agrees with the assumed closed state. Between time $t_2$ and time $t_3$, where the SS 1312 transmits a third assumption broadcast 1324, the CS 1316 determines that irrigation is to start 1326 based on a scheduled irrigation start time defined by the irrigation schedule locally stored and implemented by the CS 1316. In response to detecting the start time, the CS activates an irrigation pause 1328. In some instances, a CS 1316 may record or otherwise maintain state information of the master valve 1314 between assumption broadcasts, and accordingly the CS 1316 may further perform an evaluation 1330 in response to the irrigation start time 1326 to determine whether the shared master valve 1314 is in a desired state (e.g., an open state). In those instances where the master valve is not in the desired state the CS activates the irrigation pause 1328. Alternatively, when the master valve 1314 is in the desired state the irrigation is activated without the irrigation pause.

In response to the third assumption broadcast 1324 at time $t_3$, the CS confirms that the state of the master valve 1314 is inconsistent with the desired state and transmits a response 1332 to the third assumption broadcast effectively requesting the state of the shared master valve 1314 be changed. The SS 1312 instructs 1334 the master valve 1314 to open. A fourth assumption broadcast 1336 is subsequently transmitted at time $t_4$. In many embodiments, the SS 1312 waits to transmit the fourth assumption broadcast 1336 until a scheduled timing of the assumption broadcast (e.g., once every minute). Alternatively, in some embodiments, the fourth assumption broadcasted is transmitted by the SS 1312 in reaction to changing state information in step 1334 and to the response 1332 received from the CS 1316.

The CS 1316, in response to the fourth assumption broadcast 1336, confirms the master valve 1314 is open and accordingly does not transmit a response, unpauses the irrigation pause 1338 and further activates the irrigation 1340. Although it is not shown in FIG. 13, one or more additional assumption broadcasts, which continue to identify the state of the master valve 1314 is in the open state, may continue to be transmitted during the irrigation 1340 implemented by the CS 1316, and accordingly the CS 1314 does not transmit a response.

At some later time the scheduled irrigation at the CS 1316 is complete 1342. At a time $t_n$ following the completion of the irrigation, a fifth assumption broadcast 1344 is transmitted that continues to identify the assumed state of the master valve 1314 as being in the open state. Because the irrigation is complete 1342 at the CS 1316, the assumed state of the master valve 1314 is not consistent and the CS 1316 transmits a response 1346. Based on the response 1346, the SS 1312 can then determine whether the master valve 1314 should be closed (e.g., based on irrigation scheduling at the SS 1312 or another CS sharing the master valve) and whether the assumed state of the master valve should be changed.

Figure 14A:
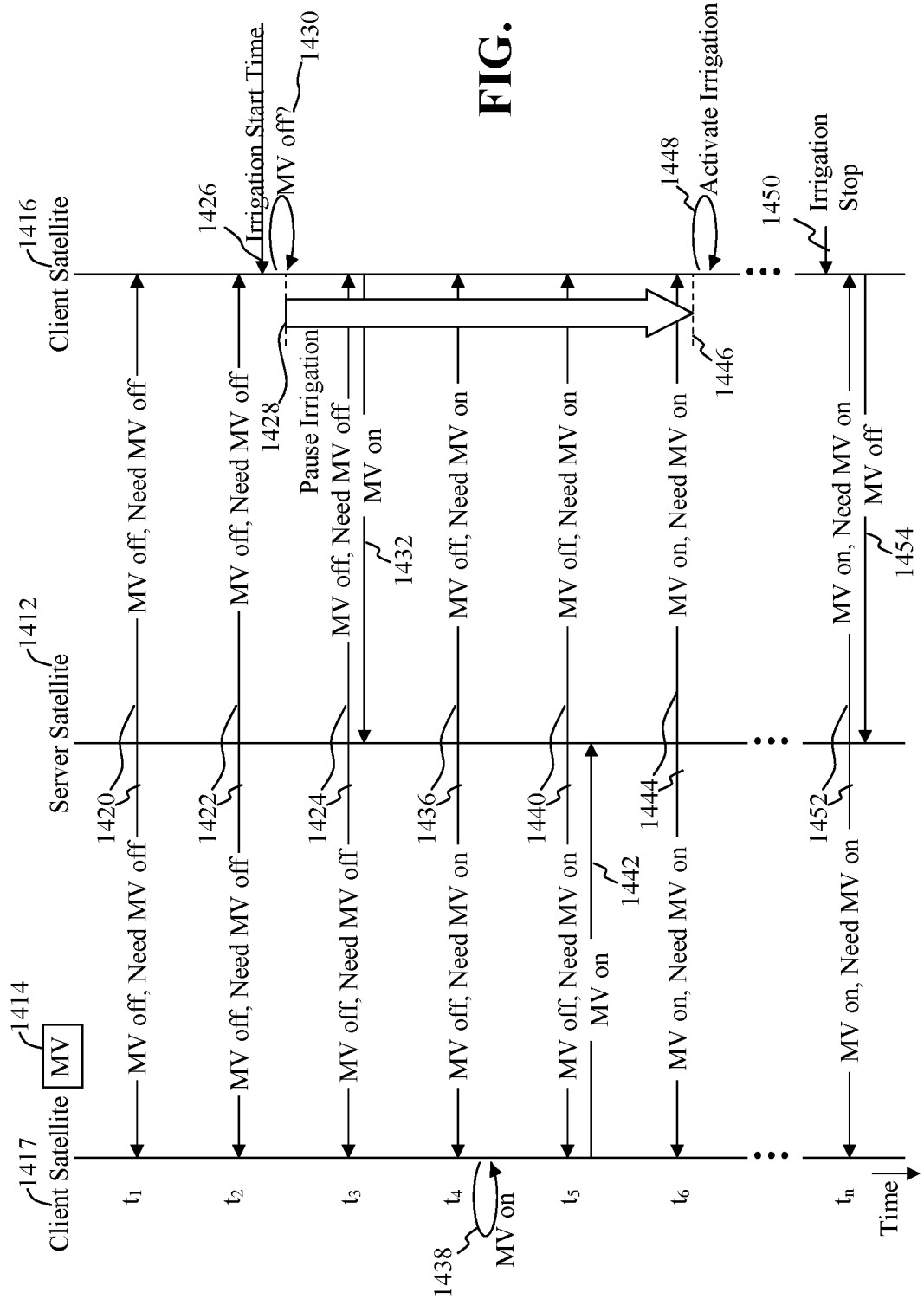
FIG. 14A depicts a simplified graphical representation of a process of implementing an irrigation pause according to some embodiments.

FIG. 14A depicts a simplified graphical representation of a process of implementing an irrigation pause according to some embodiments. In this example, a SS 1412 is part of an irrigation sub-system that includes at least two CSs 1416-1417 where the second CS 1417 directly controls a master valve 1414 that is shared at least by the first CS 1416. The SS 1412 issues at time $t_1$ a first master valve assumption broadcast 1420 that is received by both the first and second CSs 1416-1417 and identifies an assumed actual state of the master valve corresponding to the second CS 1417, and further identifies an assumed desired state of the shared master valve 1414 corresponding to the first CS 1416. At time $t_1$ both the first and second CSs 1416 agree with the corresponding assumed states of the master valve 1414 (e.g., the state is assumed closed (off) and the first CS 1416 is not scheduled to implement irrigation at time $t_1$), and as such do not transmit a response.

At time $t_2$, the SS 1412 transmits a second assumption broadcast 1422 that again indicates the assumed states corresponding to the first and second CSs 1416-1417 (e.g., master valve 1414 is closed). Again, no response is transmitted as the first CS 1416 and second CS 1417 continue to agree with the assumed closed state. At some time between time $t_2$ and time $t_3$, where the SS 1412 transmits a third assumption broadcast 1424, the first CS 1416 determines that irrigation is to start 1426 based on a scheduled irrigation start time. In response to detecting the start time, the first CS 1416 activates an irrigation pause 1428. In some instances, the first CS 1416 may perform an evaluation 1430, based on stored state information, in response to the irrigation start time 1426 to determine whether the shared master valve 1414 is in a desired state (e.g., an open state). In those instances where the master valve is not in the desired state the first CS 1416 activates the irrigation pause 1428. Alternatively, when the master valve 1414 is in the desired state the irrigation is activated without the irrigation pause.

In response to the third assumption broadcast 1424 at time $t_3$, the first CS 1416 confirms that the assumed desired state of the master valve 1414 corresponding to the first CS 1416 (e.g., Need MV off) is inconsistent with the actual desired state and transmits to the SS 1412 a response 1432 to the third assumption broadcast 1424 effectively requesting the state of the shared master valve 1414 be changed. The first CS 1416 continues to maintain the irrigation pause 1428 because no notice has been received at the first CS that the state of the master valve 1414 has changed. The SS 1412 receives the response 1432 and updates the desired assumption state of the shared master valve 1414 corresponding to the first CS 1416. Subsequently, the SS 1412 transmits a fourth assumption broadcast 1436 at time $t_4$ to the first and second CSs 1416-1417. The fourth assumption broadcast 1436 includes the updated desired assumed state information corresponding to the first CS, while still designating the assumed actual state of the master valve (e.g., MV off) corresponding to the second CS 1417. Again, the fourth assumption broadcast may be transmitted according to a schedule or as a reaction to receiving the response 1432.

The second CS 1417 is aware of those CSs within the irrigation sub-system sharing the master valve directly controlled by the second CS (i.e., the first CS 1416), and accordingly tracks the desired states in the assumption broadcasts of those CSs that share the master valve 1414. As such, the second CS 1417, in response to the fourth assumption broadcast 1436, identifies the changed desired state corresponding to the first CS 1416. In response to the detected change in desired state, the second CS 1417 confirms that the state of the master valve 1414 can be changed (e.g., that the change would not be inconsistent with a state desired by the second CS, the change would not exceed parameters (e.g., flow capacity, electrical power budget, or other such parameters), or the like). In those instances where the state can be changed the second CS 1417 instructs the master valve 1414 in step 1438 to transition to the desired state, in this example to cause the master valve 1414 to open. Alternatively, the second CS can issue a response to the assumption broadcast indicating the inconsistency.

The first CS 1416 also receives the fourth assumption broadcast 1436 and confirms that the assumed desired state is consistent with the desired state (in this example, open state). Therefore, the first CS 1416 does not transmit a response to the fourth assumption broadcast 1436. The first CS 1416 continues to maintain the irrigation pause 1428 while awaiting confirmation that the state of the master valve is consistent with a desired state.

The SS 1412 continues to transmit a subsequent assumption broadcast 1440 at time $t_5$, still indicating the assumed actual state (e.g., MV off), and the assumed desired state. The second CS 1417 identifies the inconsistency in the assumed state and the actual state as a result of the change of state in step 1438, and accordingly issues a response 1442 to the assumption broadcast notifying the SS 1412 of the change in state. The SS 1412 detects the changed state and adjusts the assumed state information such that in a subsequent assumption broadcast 1444 transmitted at time $t_6$ the changed state information is identified (e.g., that the master valve is open or on), along with the desired state corresponding to the first CS 1416. The first CS 1416 further identifies the change of state confirming that the master valve 1414 is in a state consistent with the desired state. Accordingly, the first CS 1416 unpauses the irrigation at step 1446 and activates the irrigation at step 1448 according to the irrigation schedule.

At some later time the scheduled irrigation at the first CS 1416 completes and irrigation is stopped 1450. At a time $t_n$, following the completion of the irrigation, a seventh assumption broadcast 1452 can be transmitted that continues to identify the assumed actual state of the master valve 1414 corresponding to the second CS 1417 and the assumed desired state corresponding to the first CS 1416 (e.g., an open state). Because the irrigation is complete 1450 at the first CS 1416, the assumed desired state of the master valve 1414 is not consistent and the first CS 1416 transmits a response 1454 notifying the SS 1412 of the inconsistent state. Upon receiving the response 1454, the SS 1412 can then adjust the assumed state information and a subsequent assumption broadcast can notify the second CS 1417 of the change in state. In many embodiments, as described above, the timing of the closing of the master valve 1414 is not as important as opening of the master valve.

Figure 14B:
FIG. 14B depicts a simplified graphical representation of a process of implementing an irrigation pause according to some embodiments.

FIG. 14B depicts a simplified graphical representation of a process of implementing an irrigation pause according to some embodiments, with the SS 1412 being part of an irrigation sub-system that includes at least two CSs 1416-1417 where the second CS 1417 directly controls a master valve 1414 that is shared at least by the first CS 1416. Similar to the example of FIG. 14A, the SS 1412 issues master valve assumption broadcasts (e.g., at times $t_1$, $t_2$ and $t_3$) identifying assumed states corresponding to each of the first and second CSs (e.g., the assumed state of the master valve at the first CS: MV off; and the assumed desired state at the second CS: Need MV off). At times $t_1$ and $t_2$ both the first and second CSs 1416 agree with the assumed states of the master valve 1414 (e.g., the state is assumed closed (off) and the first CS 1416 is not scheduled to implement irrigation at time $t_1$), and as such do not transmit a response.

At some time between time $t_2$ and time $t_3$, where the SS 1412 transmits a third assumption broadcast 1424, the first CS 1416 determines that irrigation is to start 1426 based on a scheduled irrigation start time. In response to detecting the start time, the first CS 1416 activates an irrigation pause 1428. In some instances, the first CS 1416 may perform an evaluation 1430, based on stored state information, in response to the irrigation start time 1426 to determine whether the shared master valve 1414 is in a desired state (e.g., an open state). In those instances where the master valve is not in the desired state the first CS 1416 activates the irrigation pause 1428. Alternatively, when the master valve 1414 is in the desired state the irrigation is activated without the irrigation pause.

In response to the third assumption broadcast 1424 at time $t_3$, the first CS 1416 confirms that the assumed desired state of the master valve 1414 corresponding to the first CS 1416 (e.g., Need MV off) is inconsistent with the actual desired state and transmits to the SS 1412 a response 1432 to the third assumption broadcast 1424 effectively requesting the state of the shared master valve 1414 be changed. The first CS 1416 continues to maintain the irrigation pause 1428 because no notice has been received at the first CS that the state of the master valve 1414 has changed. The SS 1412 receives the response 1432 and updates the assumption state of the shared master valve 1414. Subsequently, the SS 1412 transmits a fourth assumption broadcast 1460 at time $t_4$ to the first and second CSs 1416-1417. The fourth assumption broadcast 1460 includes the updated assumed state information corresponding to the first and second CSs indicating that the master valve 1414 should be in an open state and that the desired state is an open state. Again, the fourth assumption broadcast may be transmitted according to a schedule or as a reaction to receiving the response 1432.

The second CS 1417, in response to the fourth assumption broadcast, identifies the inconsistency in the state of the master valve 1414 directly being controlled by the second CS. Accordingly, the second CS 1417 interprets the changed state of the master valve 1414 as a command and activates 1462 the master valve to change states, in this example to cause the master valve 1414 to open.

The first CS 1416 also receives the fourth assumption broadcast 1436 and confirms that the assumed state of the master valve 1414 is consistent with the desired state (in this example, open state). Therefore, the first CS 1416 does not transmit a response. Further, the first CS 1416 unpauses the irrigation 1464 and activates the irrigation 1466. One or more subsequent assumption broadcasts 1468 can be transmitted, such as that sent at time is and while the first CS is implementing irrigation according to the irrigation scheduling, which continue to identify the state of the master valve 1414 as being in the on state and accordingly the first and second CSs 1416-1417 do not submit responses.

At some later time the scheduled irrigation at the first CS 1416 completes 1470. At a time $t_n$, following the completion of the irrigation, a sixth assumption broadcast 1472 can be transmitted that continues to identify the assumed state of the master valve 1414 as being in the open state. Because the irrigation is complete 1470 at the first CS 1416, the assumed state of the master valve 1414 is not consistent and the first CS 1416 transmits a response 1474. Upon receiving the response, the SS 1412 can then determine whether the master valve 1414 should be closed (e.g., based on irrigation scheduling at the SS 1412 or another CS sharing the master valve) and whether the assumed state of the master valve should be changed. In many embodiments, as described above, the timing of the closing of the master valve 1414 is not as important as opening of the master valve because the CSs sharing the master valve (e.g., first and second CSs 1416-1417).

The pausing of irrigation can be beneficial in embodiments where the time period between assumption broadcasts may adversely affect the amount of water delivered during scheduled irrigation. Further, the pause of irrigation scheduling can additionally be used in embodiments where assumption broadcasts are not implemented. For example, in some embodiments, the assumption broadcasts are not communicated and instead, a master valve borrower CS can generate a notification to the SS 112 when the borrower CS needs a shared master valve 134 to be opened and/or closed. The SS 112 can then issue a notification to the master valve owner CS to open (or close) the shared master valve. Upon receiving confirmation from the master valve owner CS that the shared master valve is open (or closed) the SS 112 can notify the requesting master valve borrower CS that the shared master valve is opened. In these instances, the delay from the request by the requesting master valve borrower CS that the master valve be opened and the confirmation at the borrower CS that the master valve is actually opened can, in some embodiments, be significant. Accordingly, the requesting CS can pause the irrigation start time until the confirmation is received. Alternatively, when the duration between assumption broadcasts is such that a resulting delay between the starting of irrigation at a borrower CS and the time the borrowed master valve is actually open may be relatively small resulting in only minimal reductions in the amount of water actually delivered, the pausing is often not implemented.

The use of the assumption broadcast can, in some instances, further mask potential problems within an irrigation system 110. For example, because CSs not directly controlling master valves and instead borrowing master valves do not respond to assumption broadcasts unless the CS desires a change in state the SS 112 would not know if the CS goes off line, has a fatal error or has another problem. Similarly, because the SS does not expect to receive responses from CSs that are in direct communication with sensors, the SS would not know if a sensor owner CS goes off line, has a fatal error or has some other problem.

Some embodiments, however, utilize a communication scheme to confirm the operation of CSs. In some instances, the communication scheme employs pinging. For example, the SS 112 can communicate one or more pings over the irrigation sub-system from which CSs are configured to respond. As such, the SS can identify when one or more CSs within the irrigation sub-system do not respond to a ping and can issue alerts or other notifications (e.g., sending information to the central controller 126, displaying a notice on a local display, generating an audible alarm, generating a communication outside the irrigation system 110 (e.g., email, text message, telephone call, etc.) and/or other such notifications or combinations of such notifications).

In some instances, the pings can include separate pings with each ping directed to a different CS. The pings can be spaced over time and interleaved with other network communications (e.g., assumption broadcasts). For example, a ping could be sent every 20 seconds, and assuming an irrigation sub-system is limited to 256 CSs, an SS would be able to confirm the operation of each CS based on received ping responses in little over an hour. In some instances, some CSs may be given higher priorities and thus pinged more often than those with lower priorities. For example, a SS is less likely to receive responses to master valve assumption broadcasts from those CSs that do not directly control a master valve (master valve borrower CSs). Similarly, responses are needed from CSs that in direct communication with a sensor (sensor owner CSs) in order to confirm that the CSs can accurately provide the sensor information. Accordingly, master valve borrower CSs may be given a higher priority than master valve owner CSs, and sensor owner CSs may be given a higher priority that sensor borrower CSs. Other priorities can additionally or alternatively be applied. Further, in some embodiments, the ping timing may be on a graduated schedule, such that when a larger number of CSs are included in the irrigation sub-system 120 the expected response time can be increased and/or the duration between pings can be increased. The SS 112 may further be configured, in some embodiments, to perform pings even when a configured network is empty. A special address may be used that is a non-existent CS in these instances. This provides that network traffic exists periodically, which can obviate the need for a network heartbeat.

Some embodiments may employ a multi-response ping configuration. For example, in some instances a single ping message may be sent out with each CS of an irrigation sub-system 120 being configured to response. Further, the CSs may response based on some back-off timing (e.g., 20 second intervals based on a CS's address), which may help to limit or avoid collisions. Because responses typically may not be guaranteed due to possible collisions, some embodiments use a bitmap of CSs that are being pinged in the ping request. The SS 112 could then remove those CSs' ping bits in the next ping broadcast that have already responded to avoid a ping response from the already collected CS responses. This would reduce ping response traffic and reduce collisions the next time the ping is transmitted. After a certain time period the SS 112 would typically then attempt to re-ping all of the CSs of the irrigation sub-system 120 (e.g., set all the ping bits corresponding to each CS of the irrigation sub-system in the ping broadcast).

Further, the CSs may enter a fail safe mode, such as when a failure is due to a failure in implementing the master valve and/or sensor sharing. In a fail safe mode, a CS can control irrigation based on the fail safe mode until overridden by a user or communication is reestablished. For example, in some embodiments, should the control panel 614, 714 lose communication with the communication interface 616, 716, the front panel could be configured to assume that shared sensors are now inactive, which typically would allow watering to resume. The front panel may further assume that shared master valve requests are no longer needed, which may avoid a master valve staying open. Should a communication interface 716 stop receiving master valve and/or sensor assumption broadcasts from the SS 112, the communication interface 716 can be configured, in some embodiments, to instruct the control panel 714 that shared sensors are now inactive, and that shared master valve requests are no longer needed. In some instances, this can similarly address a situation where the central controller 126 notifies the SS 112 that, for example, a different CS now has a borrowed master valve. The SS can stop telling the CS the master valve requests such that the CS will timeout and drop previous open requests.

Figure 15:
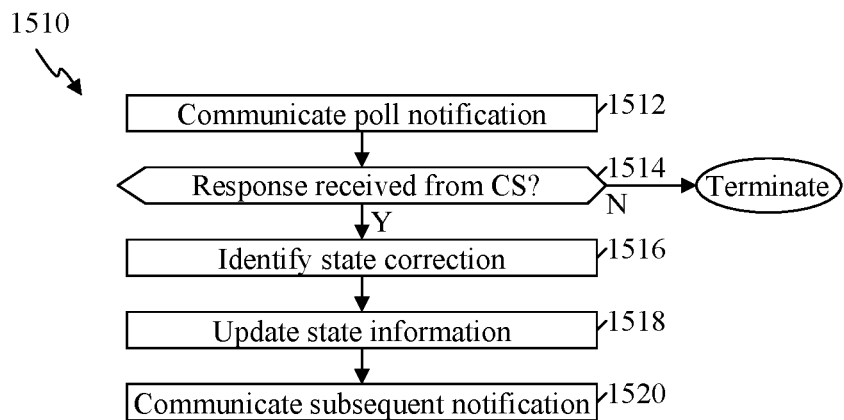
FIG. 15 depicts a simplified flow diagram of a process of coordinating and controlling irrigation according to some embodiments.

FIG. 15 depicts a simplified flow diagram of a process 1510 of coordinating and controlling irrigation according to some embodiments. In step 1512, a SS 112 communicates an assumption broadcast over the irrigation sub-system 120. As described above, the assumption broadcast can designate assumed states of one or more control elements and/or one or more types of control elements, such as one or more master valves, switches, sensors, pumps and/or other such control elements. Further, the assumption broadcast, in some embodiments, is configured according to a predefined layout, such as single bit corresponding to each CS 113-116 of the irrigation sub-system 120 and/or corresponding to each control element. For example, the assumption broadcast can include a series of bits, with each bit or a sequent of bits defining a state of a control element, and each bit or series of bits further being associated with one of the CSs 113-116 of the irrigation sub-system 120 and/or a control element (e.g., a sensor).

In step 1514, it is determined whether a response is received based on the assumption broadcast. When no response is received the process 1510 terminates. Alternatively, when a response is received, step 1516 is entered and the response is parsed to identify the designated change in state specified in the response and, when relevant, identify the CS (e.g., second CS 114) transmitting the response and/or a control element with which the change in state corresponds. In step 1518, the state information corresponding to the relevant control element shared by the identified CS 114 is updated. For example, the SS 112 may update a locally stored database and/or the master valve and/or sensor sharing configurations and/or mapping table or tables. In step 1520, a subsequent assumption broadcast is transmitted including the updated state information. In some implementations, the subsequent assumption broadcast is transmitted according to some schedule of broadcasts (e.g., once every 2 minutes, once every minute or some other schedule). In other embodiments, a subsequent assumption broadcast may be transmitted in response to updating the state information and/or in reply of the response received from the CS.

Figure 16:
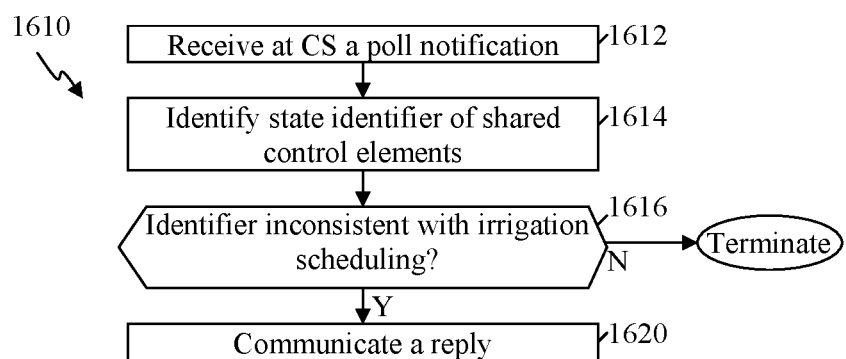
FIG. 16 depicts a simplified flow diagram of a process implemented by a CS in accordance with some embodiments in implementing and/or coordinating irrigation scheduling.

FIG. 16 depicts a simplified flow diagram of a process 1610 implemented by a CS (e.g., first CS 113) in accordance with some embodiments in implementing and/or coordinating irrigation scheduling. In step 1612, an assumption broadcast is received that identifies state information corresponding to one or more control elements. As described above, the assumption broadcast can be a master valve assumption broadcast, a sensor assumption broadcast, an assumption broadcast including state information for master valves and sensor, or other such assumption broadcasts that may be specific to a type of control element or have state information for a combination of two or more different types of control elements (e.g., master valves, sensors, switches, pumps, etc.).

In step 1614, the first CS 113 identifies the state information corresponding to the first CS. Again, the assumption broadcast may be configured with each bit being associated with a CS. In other instances, the assumption broadcast may be configured with each bit being associated with a control element and the CS knowing which control element the CS is sharing. In step 1616, it is determined whether the state of the control element specified in the assumption broadcast is consistent with the state anticipated by the CS. For example, with state information defining a state of a master valve shared by the CS, the CS determines whether the master valve is in a state consistent with irrigation scheduling being implemented or to be implemented by the CS. Similarly, when the state information defines state information corresponding to sensor information, the CS can determine whether the specified state information is consistent with sensor information received by the CS from a sensor in direct communication with the CS.

In response to confirming, in step 1616, that the state information is consistent with anticipated state information, the process 1610 terminates and no response is generated or transmitted by the CS. Alternatively, when the state information is inconsistent with anticipated state information, step 1620 is entered where a response is generated and transmitted.

Figure 17:
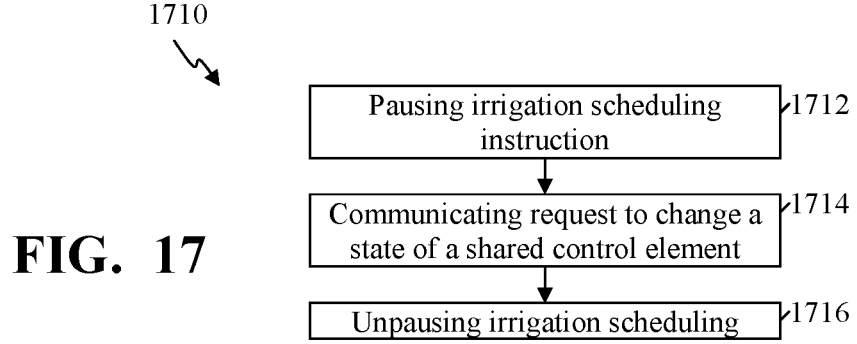
FIG. 17 depicts a simplified flow diagram of a process implemented by a CS or SS in pausing irrigation while activating a change in state of a control element.

FIG. 17 depicts a simplified flow diagram of a process 1710 implemented by a CS or SS in pausing irrigation while activating a change in state of a control element, such as a master valve, switch, pump or the like. In step 1712, the activation of a scheduled irrigation is paused, based on a determination that a state of one or more shared control elements shared by a CS is inconsistent with an irrigation scheduling instruction.

In step 1714, the CS communicates a request that the state of the control element be altered to a state desired by the CS and in accordance with the irrigation scheduling. In many instances, this request would be in the form of a response to a notification (e.g., an assumption broadcast), where the request identifies a change of state associated with the shared control element that is consistent with the desired state in accordance with irrigation scheduling instruction. In step 1716, the CS unpauses the activation of irrigation in response to receiving a subsequent notification and confirming the identified change of state of the control element is indicated in the subsequent notification.

Figure 18:
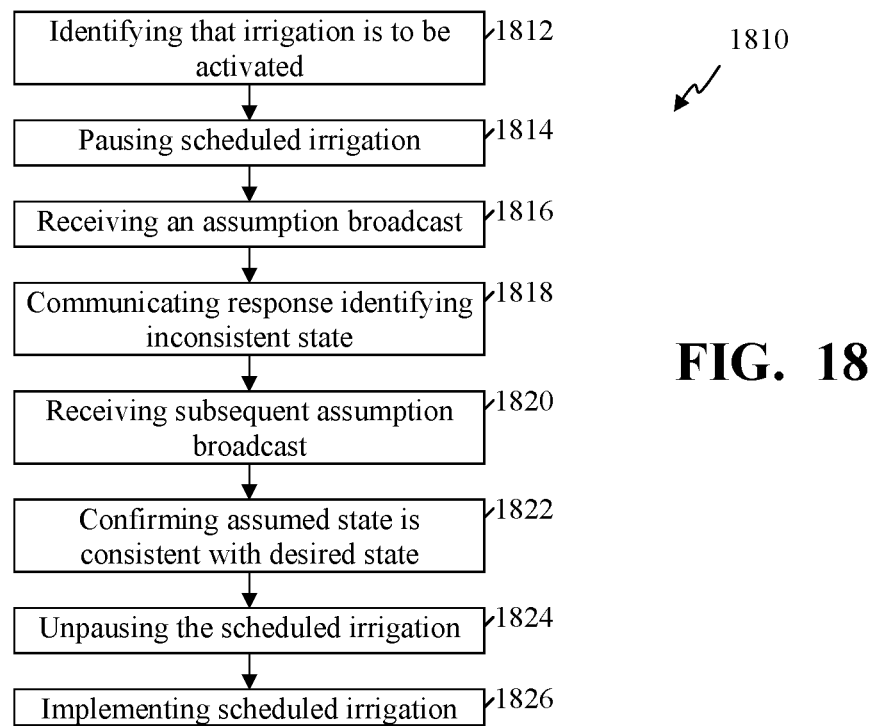
FIG. 18 depicts a simplified flow diagram of a process implemented by a CS or SS in pausing irrigation while activating a change in state of a control element.

FIG. 18 depicts a simplified flow diagram of a process 1810 implemented by a CS or SS in pausing irrigation while activating a change in state of a control element, such as a master valve, switch, pump or the like. In step 1812, a CS (e.g., a first CS 113) identifies based on a locally stored and implemented irrigation scheduling that irrigation is to be activated. Further, in some instances, the CS is aware based on a previously received assumption broadcast that a state of a shared control element (e.g., a pump, master valve or the like) that is not directly controlled by the CS is in a state that is not consistent with implementing the scheduled irrigation. In step 1814, the CS pauses the scheduled irrigation based on the knowledge that the assumed state of the shared control element is in the inconsistent state.

In step 1816, the CS receives an assumption broadcast while continuing to maintain the scheduled irrigation in the paused state. In step 1818, the CS confirms that the relevant shared control element is in the inconsistent state from a desired state to implement the scheduled irrigation. In step 1820, a response to the assumption broadcast is communicated with a notification that the state of the shared control element is inconsistent with the state desired by the CS. In step 1822, the CS receives a subsequent assumption broadcast and confirms that the assumed state of the control element has in fact been changed and is consistent with the state desired by the CS. As described above, in some instances at response to an assumption broadcast may not accurately be received by the SS (or for some reason could not be changed), and accordingly the CS would again transmit a response, repeating step 1816, to one or more assumption broadcasts that did not identify an assumed state of the shared control element that is consistent with the desired state.

In step 1824, the CS unpauses the scheduled irrigation in response to the confirmation, in step 1822, that the assumed state identified in the subsequent assumption broadcast is consistent with the desired state. In step 1826, the CS implements one or more irrigation scheduling instructions.

Figure 19:
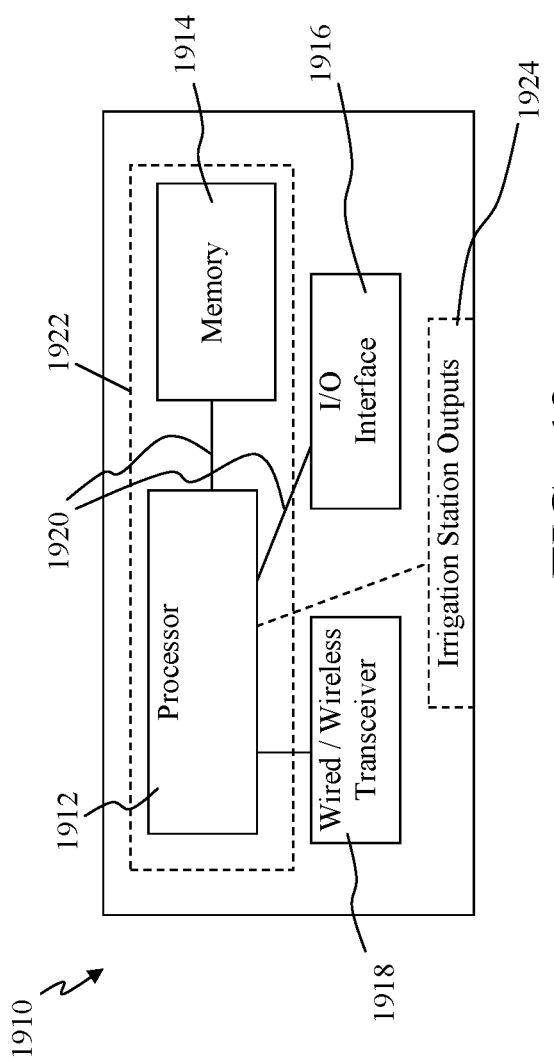
FIG. 19 illustrates a system for use in implementing methods, techniques, devices, apparatuses, systems, servers, sources and the like in controlling irrigation in accordance with some embodiments.

The methods, techniques, devices, irrigation controllers, satellite irrigation controllers, central controllers, services, servers, sources, systems and the like described herein may be utilized, implemented and/or run on many different types of devices and/or systems. Referring to FIG. 19, there is illustrated a system 1910 that may be used for any such implementations, in accordance with some embodiments. One or more components of the system 1910 may be used for implementing any system, apparatus or device mentioned above or below, such as for example any of the above or below mentioned SS 112, CS (e.g., CS 113), central controller 126, other satellite irrigation controllers (e.g., satellite irrigation controllers 117-118), remote sources, and the like. However, the use of the system 1910 or any portion thereof is certainly not required.

By way of example, the system 1910 may comprise a controller or processor module 1912, memory 1914, an input/output interface 1916, a communication transceiver 1918, and one or more communication links, paths, buses or the like 1920. A power source or supply (not shown) is included or coupled with the system 1910. In some implementations the controller 1912 and memory 1914 can be incorporated into a control panel 1922, such as a control panel 614 of an irrigation controller 610. In some embodiments, the system 1910 can include one or more irrigation station outputs 1924 that can operate one or more master valves 134, irrigation valves 122, pumps, or other such devices. Further, in some implementations, the irrigation station outputs may be part of modules cooperated with the system 1910, such as control modules 618-620.

The controller 1912 can be implemented through one or more processors, microprocessors, central processing unit, logic, local digital storage, firmware and/or other control hardware and/or software, and may be used to execute or assist in executing the steps of the methods, processes and techniques described herein, and control various communications, programs, content, listings, services, interfaces, etc. In some embodiments, the controller 1912 may be split between multiple processors. For example, some of the control (such as irrigation control may be controlled through a controller on the control panel 614, while some of the control (such master valve and/or sensor control and/or the use of shared master valve and/or sensor information) may be controlled through a controller in the communication interface 616, with the controllers cooperating and communicating to provide appropriate control.

The memory 1914, which can be accessed by the controller 1912, typically includes one or more processor readable and/or computer readable media accessed by at least the controller 1912, and can include volatile and/or nonvolatile media, such as RAM, ROM, EEPROM, flash memory and/or other memory technology. Further, the memory 1914 is shown as internal to the system 1910; however, the memory 1914 can be internal, external or a combination of internal and external memory, as well as internal and/or external to the controller 1912. The external memory can be substantially any relevant memory such as, but not limited to, one or more of flash memory secure digital (SD) card, universal serial bus (USB) stick or drive, other memory cards, hard drive and other such memory or combinations of such memory. The memory 1914 can store code, software, executables, scripts, data, content, libraries, configurations, bit maps, irrigation schedules, states of one or more control elements, lookup tables, passcodes, links, login information, GUIs, programming, programs, textual content, identifiers, log or history data, user information and the like. In some embodiments, memory of the system 1910 (e.g., within controller 1912 and/or memory 1914) stores executable program code or instructions that when executed by a processor of the controller 1910 cause the system 1910 to perform one or more functions such as described herein.

The I/O interface 1916 can include one or more user interfaces that can allow a user to interact with the system 1910 and/or irrigation system 110 and receive information through the system 1910. In some instances, the user interface can include a display and/or one or more user inputs, such as buttons, dials, keyboard, touch pad, mouse, track ball, touch screen, remote control, etc., which can be part of or wired or wirelessly coupled with the system 1910.

Typically, the system 1910 further includes one or more communication interfaces, ports, transceivers 1918 and the like allowing the system 1910 to communication over buses, networks, communication channels with other devices and/or other such communications. Further the one or more transceivers 918 can be configured for wired, wireless, optical, fiber optic cable or other such communication configurations or combinations of such communications. In some instances, the communication interfaces may include ports to communicate with a communication interface 616, connectors to communicationally couple with control modules 618-620 (e.g., mounting slot connectors), USB ports, RS232 ports, ports to an antenna, Ethernet ports, and/or other such ports or combinations of such ports.

The system 1910 comprises an example of a control and/or processor-based system with the controller 1912. Again, the controller 1912 can be implemented through one or more processors, controllers, central processing units, logic, software and the like. Further, in some implementations the controller 1912 may provide multiprocessor functionality.

Figure 20:
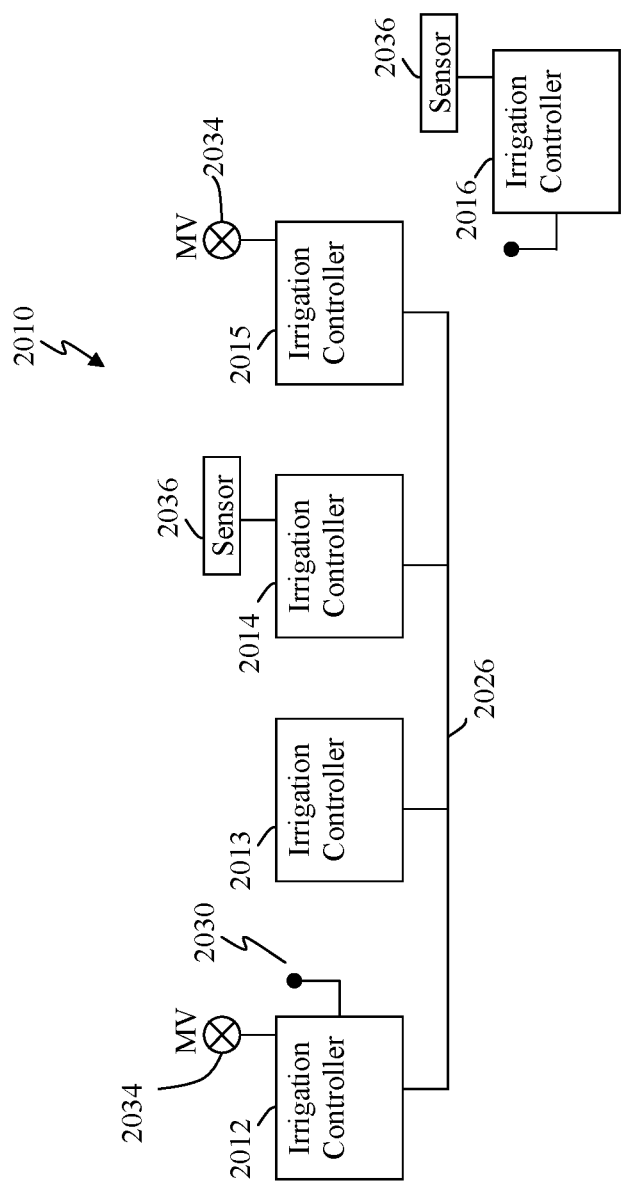
FIG. 20 depicts a simplified block diagram of an irrigation system according to some embodiments.

As described above, in some embodiments, the irrigation system employing the SS and CSs does not have to be part of a central control irrigation system. FIG. 20 depicts a simplified block diagram of a generic irrigation system 2010 according to some embodiments. The irrigation system 2010 includes a SS 2012, a plurality of CSs 2013-2016 and one or more shared control elements, such as one or more shared master valves 2034 and/or one or more shared sensors 2036. The SS 2012 can be configured to communicate with the CSs via a wired communication link 2026 and/or a wireless communication link 2030.

Generically, the SS may be referred to as a first irrigation controller and the CSs may be referred to as other irrigation controllers. In some embodiments, the first controller is a master and the other controllers are slaves (i.e., there is a hierarchical control relationship between the first and other controllers). In other embodiments, the first controller acts as a router or coordinator for communications, but is not necessarily a master to the other controllers. In other embodiments, the first controller is a traditional central controller and the other controllers are satellite controllers. In other embodiments, the first controller couples to a controlling central controller, such as shown in the embodiments of at least FIGS. 1 and 2.

Further, the SS 2012 can distribute assumption broadcasts to the CSs 2013-2016. In some instances, the SS 2012 can further distribute irrigation schedules to the CSs 2013-2016. In other instances, irrigation scheduling may be defined locally at each CS (e.g., through user interface on each CS) and/or remotely provided, such as through a portable device that can communicationally couple wired or wirelessly with one or more of the CSs 2013-2016, over a distributed network (e.g., the Internet), or other such remote communication. The CSs 2013-2016 can evaluate the assumptions based at least on one locally stored irrigation schedule and transmit responses to the SS 2012 when relevant. With the assumed state information incorporated in the assumption broadcasts and the locally stored irrigation schedules, the SS 2012 and the CSs 2013-2016 can implement irrigation over a geographic area covered by the irrigation system 2010.

One or more of the embodiments, methods, processes, approaches, and/or techniques described above or below may be implemented in one or more computer programs executable by a processor-based system. By way of example, such a processor based system may comprise the processor based system 1910, separate irrigation controller, satellite irrigation controllers, a computer, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for allowing the control of irrigation through an irrigation sub-system 120 with a SS 112 in communication with one or more CSs 113-116. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer and/or processor readable storage or recording medium or media, such as any of the computer and/or processor readable storage or recording medium or media described herein.

Accordingly, some embodiments provide a processor or computer program product comprising a medium for embodying a computer program to be implemented by a processor or computer and a computer program embodied in the medium for causing the processor or computer to perform or execute steps comprising any one or more of the steps involved in any one or more of the embodiments, methods, processes, approaches, and/or techniques described herein. In some embodiments, memory of the SS and/or CS stores executable program code or instructions that when executed by a processor of the SS or CS causes the SS or CS to perform one or more functions such as described herein. For example, some embodiments provide one or more computer-readable storage mediums storing one or more computer programs for use with a computer simulation, the one or more computer programs adapted to cause a computer and/or processor based system to execute steps comprising: communicating an assumption broadcast from a first irrigation controller to each of a plurality of other irrigation controllers of an irrigation system, where the assumption broadcast defines assumed states of operation of one or more control elements each coupled to a respective one of the first irrigation controller or a respective one of the plurality of other irrigation controllers of the irrigation system, wherein the irrigation system is configured to implement irrigation scheduling instructions, wherein the one or more control elements are shared with one or more of the first irrigation controller and the plurality of other irrigation controllers of the irrigation system that are not coupled to the one or more control elements; determining whether a reply is received from one or more of the plurality of other irrigation controllers in reply to the assumption broadcast; identifying, from the reply, a correction to a state corresponding to a first control element of the one or more control elements, where the first control element is associated with a first of the plurality of other irrigation controllers; updating state information corresponding to the first control element in response to the identifying the correction; and communicating a subsequent notification from the first irrigation controller to each of the plurality of other irrigation controllers of the irrigation system, where the subsequent notification comprises the updated state information corresponding to the first control element.

Other embodiments provide one or more computer-readable storage mediums storing one or more computer programs configured for use with a computer simulation, the one or more computer programs configured to cause a computer and/or processor based system to execute steps comprising: receiving, at a first client satellite irrigation controller of a sub-system of a central control irrigation system, an assumption broadcast communicated from a server satellite irrigation controller to each of one or more client satellite irrigation controllers of the sub-system, where the assumption broadcast comprises a plurality of state identifiers identifying assumed states of one or more control elements within the sub-system, wherein the central control irrigation system includes a computer based central controller configured to communicate irrigation scheduling instructions to the server satellite irrigation controller, wherein the one or more control elements are shared with one or more of the server satellite irrigation controller and the one or more client satellite irrigation controllers of the sub-system that are not coupled to the one or more control elements; identifying within the assumption broadcast each state identifier that is associated with one or more shared control elements shared with the first client satellite irrigation controller; determining whether one or more of the state identifiers associated with the shared control elements shared with the first client satellite irrigation controller are inconsistent with an irrigation scheduling instruction being implemented by the first client satellite irrigation controller; and communicating a reply to the assumption broadcast when it is determined that one or more of the state identifiers associated with the shared control elements shared with the first client satellite irrigation controller are inconsistent with the irrigation scheduling instruction.

Some embodiments additionally provide computer program products configured to cause the processor based system to perform steps comprising: communicating, from a first additional irrigation controller of a plurality of additional irrigation controllers of an irrigation system and to a first irrigation controller of the irrigation system, a request that a first control element, being shared with and not directly controlled by the first additional irrigation controller, be transitioned to a first state in accordance with an irrigation scheduling instruction stored at the first additional irrigation controller and being implemented by the first additional irrigation controller in response to the first additional irrigation controller determining the first control element is in a second state and inconsistent with the irrigation scheduling instruction, wherein the first control element is shared with the first additional irrigation controller and one or more of the first irrigation controller and the plurality of additional irrigation controllers of the irrigation system and where the plurality of additional irrigation controllers are cooperated, within the irrigation system, with the first irrigation controller; pausing, at the first additional irrigation controller, the irrigation scheduling instruction at a beginning of an irrigation cycle being implemented at the first additional irrigation controller; receiving a notification identifying that the first control element has been changed to the first state; unpausing, at the first additional irrigation controller, the irrigation scheduling instruction at the first additional irrigation controller in response to the notification that the first control element has been changed to the first state; and executing, at the first additional irrigation controller, the irrigation scheduling instruction.

Some embodiments provide methods of controlling irrigation, where some of these methods comprise: communicating a poll notification from a server satellite irrigation controller to each of a plurality of client satellite irrigation controllers of a sub-system of a central control irrigation system, where the poll notification defines assumed states of operation of one or more control elements each coupled to a respective one of the server satellite irrigation controller or a respective one of the plurality of client satellite irrigation controllers of the sub-system, wherein the central control irrigation system includes a computer based central controller configured to communicate irrigation scheduling instructions to the server satellite irrigation controller, wherein the one or more control elements are shared with one or more of the server satellite irrigation controller and the plurality of client satellite irrigation controllers of the sub-system that are not coupled to the one or more control elements; determining whether a reply is received from one or more of the plurality of client satellite irrigation controllers in reply to the poll notification; identifying, from the reply, a correction to a state corresponding to a first control element of the one or more control elements, where the first control element is associated with a first client satellite irrigation controller of the plurality of client satellite irrigation controllers; updating state information corresponding to the first control element in response to the identifying the correction; and communicating a subsequent notification from the server satellite irrigation controller to each of the plurality of client satellite irrigation controllers of the sub-system, where the subsequent notification comprises the updated state information corresponding to the first control element.

Further embodiments provide methods of controlling irrigation, comprising: communicating a poll notification from a first irrigation controller to each of a plurality of subordinate irrigation controllers of an irrigation system, where the poll notification defines assumed states of operation of one or more control elements each coupled to a respective one of the first irrigation controller or a respective one of the plurality of subordinate irrigation controllers of the irrigation system, wherein the irrigation system is configured to implement irrigation scheduling instructions, wherein the one or more control elements are shared with one or more of the first irrigation controller and the plurality of subordinate irrigation controllers of the irrigation system that are not coupled to the one or more control elements; determining whether a reply is received from one or more of the plurality of subordinate irrigation controllers in reply to the poll notification; identifying, from the reply, a correction to a state corresponding to a first control element of the one or more control elements, where the first control element is associated with a first subordinate irrigation controller of the plurality of subordinate irrigation controllers; updating state information corresponding to the first control element in response to the identifying the correction; and communicating a subsequent notification from the first irrigation controller to each of the plurality of subordinate irrigation controllers of the irrigation system, where the subsequent notification comprises the updated state information corresponding to the first control element. Additionally, in some instances, the irrigation system further comprises a central control irrigation system comprising a sub-system of the central control irrigation system, where the sub-system comprises the first irrigation controller and each of the plurality of subordinate irrigation controllers, and where the central control irrigation system includes a computer based central controller configured to communicate the irrigation scheduling instructions to the first irrigation controller.

Other embodiments provide methods of controlling irrigation, comprising: communicating, from a first client satellite irrigation controller of a plurality of client satellite irrigation controllers of an irrigation sub-system to a server satellite irrigation controller of the irrigation sub-system, a request that a master valve being shared with the first client satellite irrigation controller be opened in accordance with an irrigation scheduling instruction stored at the first client satellite irrigation controller and being implemented by the first client satellite irrigation controller in response to the first client satellite irrigation controller determining the master valve is closed and inconsistent with the irrigation scheduling instruction, where the irrigation sub-system is part of a central control irrigation system that includes a computer based central controller configured to communicate irrigation scheduling instructions to the server satellite irrigation controller, wherein the master valve is shared with the first client satellite irrigation controller and one or more of the server satellite irrigation controller and the plurality of client satellite irrigation controllers of the sub-system; pausing at the first client satellite irrigation controller the irrigation scheduling instruction at a beginning of an irrigation cycle being implemented at the first client satellite irrigation controller; receiving a notification identifying a changed state of the master valve, where the state confirms the master valve is changed to an open state; unpausing, at the first client satellite irrigation controller, the irrigation scheduling instruction at the first client satellite irrigation controller in response to the notification of the changed state of the master valve; and executing the irrigation scheduling instruction.

Many of the functional units described in this specification have been labeled as devices and modules, in order to more particularly emphasize their implementation independence. For example, a device or module may be implemented as a hardware circuit comprising custom VLSI circuits or gate arrays, off-the-shelf semiconductors such as logic chips, transistors, or other discrete components. A device or module may also be implemented in programmable hardware devices such as field programmable gate arrays, programmable array logic, programmable logic devices or the like.

Devices or modules may also be implemented in software for execution by various types of processors. An identified device or module of executable code may, for instance, comprise one or more physical or logical blocks of computer instructions that may, for instance, be organized as an object, procedure, or function. Nevertheless, the executables of an identified device or module need not be physically located together, but may comprise disparate instructions stored in different locations which, when joined logically together, comprise the device or module and achieve the stated purpose for the device or module.

Indeed, a device or module of executable code could be a single instruction, or many instructions, and may even be distributed over several different code segments, among different programs, and across several memory devices. Similarly, operational data may be identified and illustrated herein within devices or modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of controlling irrigation, the method comprising:
    causing, by a computer, a first message to be communicated to a plurality of irrigation controllers of an irrigation system, wherein the computer is remote from at least one of the plurality of irrigation controllers and wherein the first message defines an assumed state of a control element coupled to a first irrigation controller of the plurality of irrigation controllers, wherein the irrigation system is configured to implement irrigation scheduling instructions;
    identifying, from a second message received from the first irrigation controller, a correction to the assumed state of the control element;
    updating state information corresponding to the control element in response to the identifying the correction; and causing a subsequent message to be communicated to the plurality of irrigation controllers, wherein the subsequent message comprises the updated state information corresponding to the control element.

2. The method of claim 1, wherein the irrigation system comprises a central control irrigation system comprising a sub-system of the central control irrigation system, wherein the sub-system comprises the plurality of irrigation controllers, and wherein the computer comprises a computer based central controller configured to communicate the irrigation scheduling instructions to one or more of the plurality of irrigation controllers.

3. The method of claim 1, further comprising:
causing, by the computer, a communication sharing configuration data to one or more of the plurality of irrigation controllers, wherein the sharing configuration data identifies which one or more of the plurality of irrigation controllers share the control element.

4. The method of claim 1, wherein the control element comprises a master valve, wherein the assumed state comprises a state of the master valve defining whether the master valve is in an open state or a closed state.

5. The method of claim 1, wherein the first message comprises a plurality of predefined locations within the first message, wherein a different one of the plurality of predefined locations corresponds to a different one of the plurality of irrigation controllers wherein one of the plurality of predefined locations corresponds to the first irrigation controller and defines the assumed state of the control element.

6. The method of claim 1, wherein the control element comprises a sensor, wherein the assumed state comprises an assumed sensor state of the sensor.

7. The method of claim 6, wherein the assumed sensor state of the sensor identifies whether one or more of the plurality of irrigation controllers sharing the sensor are to interrupt an irrigation scheduling instruction of the irrigation scheduling instructions.

8. The method of claim 1, wherein each of the plurality of irrigation controllers couples with one or more irrigation valves and is configured to activate the one or more irrigation valves in implementing additional irrigation scheduling instructions.

9. The method of claim 1, wherein the computer comprises at least one of a central computer, remote server and a mobile computer.

10. The method of claim 1, wherein a subset of two or more of the plurality of irrigation controllers do not directly communicate with one another.

11. The method of claim 1, wherein the first message is configured to inform each of the plurality of irrigation controllers of the assumed state of the control element.

12. The method of claim 1, wherein the second message is only received when the assumed state of the control element is inconsistent with an irrigation scheduling instruction, of the irrigation scheduling instructions, being implemented by the first irrigation controller.

13. The method of claim 1, wherein the second message is received from the first irrigation controller only when the assumed state corresponding to the control element associated with the first irrigation controller is inconsistent with a state expected by the first irrigation controller.

14. The method of claim 1, further comprising:
identifying indicators of sensed operating states of one or more sensors within the irrigation system, with each of the one or more sensors being coupled to a respective one of the plurality of irrigation controllers; and
communicating a sensor message to each of the plurality of irrigation controllers, wherein the sensor message comprises one or more indicators of the sensed operating states of the one or more sensors.

15. An irrigation system comprising:
a computer;
a plurality of irrigation controllers, wherein one or more of the plurality of irrigation controllers are in communication with the computer, wherein the computer is remote from at least one of the one or more of the plurality of irrigation controllers; and
a control element coupled to a first irrigation controller of the plurality of irrigation controllers;
wherein the computer is configured to:
cause a first message to be communicated to the plurality of irrigation controllers, wherein the first message defines an assumed state of operation of the control element;
identify, from a second message received from the first irrigation controller, a correction to the assumed state of the control element;
update state information corresponding to the control element in response to the correction having been identified; and
cause a subsequent message to be communicated to the plurality of irrigation controllers, wherein the subsequent message comprises the updated state information corresponding to the control element.

16. The irrigation system of claim 15, wherein the control element comprises a master valve.

17. The irrigation system of claim 15, further comprising a second irrigation controller of the plurality of irrigation controllers;
wherein the control element comprises a master valve, wherein the master valve is controlled by the second irrigation controller, such that the second irrigation controller is configured to alter a state of the master valve in response to the second message when the assumed state corresponding to the master valve defined in the second message is different than an expected state of the master valve as expected by the second irrigation controller.

18. The irrigation system of claim 15, wherein a second irrigation controller of the plurality of irrigation controllers shares the control element, and wherein the second irrigation controller is configured to communicate a third message when the assumed state of the control element as defined in the first message is inconsistent with an irrigation scheduling instruction being implemented at the second irrigation controller.

19. The irrigation system of claim 18, wherein the first irrigation controller is configured to alter the state of the control element in response to the subsequent message communicated following the third message from the second irrigation controller, wherein the subsequent message identifies the assumed state is different than an actual state of the control element as controlled by the first irrigation controller.

20. The irrigation system of claim 15, wherein the first irrigation controller is further configured to:
communicatively couple with a sensor to receive sensor information from the sensor and obtain a sensed state based on the sensor information communicated by the sensor; and
communicate the second message in response to the assumed state defined in the first message being inconsistent with the sensed state.

21. The irrigation system of claim 15, wherein the computer comprises at least one of a central computer, remote server and a mobile computer.

22. An irrigation system comprising:
- a computer-based central irrigation controller configured to communicatively couple with multiple satellite controllers; and
- a sub-system comprising:
  - a server irrigation controller of the multiple satellite controllers, in communication with the computer-based central irrigation controller;
  - a first satellite controller, of the multiple satellite controllers, coupled with a sensor;
  - a second satellite controller, of the multiple satellite controllers, wherein the second satellite controller is in communication with the server irrigation controller and wherein the second satellite controller controls one or more irrigation devices in implementing respective irrigation scheduling instructions; and
  - a control element coupled with one of the server irrigation controller and the second satellite controller and shared with the other of the server irrigation controller and the second satellite controller, wherein the first satellite controller is not coupled with the control element;
- wherein the server irrigation controller is configured to:
  - receive a message from the first satellite controller indicating an updated state of the sensor;
  - identify, from the message, a correction to an assumed sensor state corresponding to the sensor;
  - update sensor state information corresponding to the sensor in response to the correction having been identified; and
  - communicate at least one subsequent message to at least the first satellite controller and the second satellite controller, wherein the at least one subsequent message comprises the updated sensor state information corresponding to the sensor and an assumed state of the control element.

23. The irrigation system of claim 22, wherein the control element comprises one of: a master valve, wherein the assumed state comprises a state of the master valve defining whether the master valve is in an open state or a closed state; and an additional sensor, where the assumed state comprises an assumed sensor state of the sensor.

* * * * *